United States Patent [19]

Kouno

[11] Patent Number: 4,987,967
[45] Date of Patent: Jan. 29, 1991

[54] METHOD OF CONTROLLING A FOUR WHEEL DRIVE VEHICLE

[75] Inventor: Katsumi Kouno, Susono, Japan

[73] Assignee: Toyota Jidosha Kabushiki Kaisha, Aichi, Japan

[21] Appl. No.: 409,158

[22] Filed: Sep. 19, 1989

Related U.S. Application Data

[62] Division of Ser. No. 83,847, Aug. 10, 1987, Pat. No. 4,884,653.

[30] Foreign Application Priority Data

Aug. 8, 1986 [JP] Japan .................. 61-186495
Dec. 1, 1986 [JP] Japan .................. 61-286294

[51] Int. Cl.⁵ .............................. B60K 17/34
[52] U.S. Cl. ........................ 180/233; 74/866; 364/424.1; 474/28
[58] Field of Search ........... 180/233; 74/866; 474/28; 364/424.1

[56] References Cited

U.S. PATENT DOCUMENTS

| | | | |
|---|---|---|---|
| 4,546,673 | 10/1985 | Shigematsu | 74/866 |
| 4,551,119 | 11/1985 | Sugaya | 474/28 |
| 4,605,084 | 8/1986 | Haynes et al. | 180/233 X |
| 4,619,629 | 10/1986 | Shigematsu | 474/28 |
| 4,701,853 | 10/1987 | Osanai | 364/424.1 |
| 4,709,775 | 12/1987 | Watanabe et al. | 180/233 |
| 4,723,624 | 2/1988 | Kawasaki et al. | 180/233 |
| 4,754,835 | 7/1988 | Stelter | 180/248 |
| 4,773,500 | 9/1988 | Naito | 180/233 |

FOREIGN PATENT DOCUMENTS

| | | | |
|---|---|---|---|
| 59-151661 | 8/1984 | Japan . | |
| 295133 | 12/1986 | Japan | 180/233 |
| 279127 | 12/1987 | Japan | 180/233 |
| 2159110 | 11/1985 | United Kingdom . | |

OTHER PUBLICATIONS

Article from "MotorFan" dated 12/85.

Primary Examiner—Mitchell J. Hill
Attorney, Agent, or Firm—Oliff & Berridge

[57] ABSTRACT

A controlling method of a four wheel drive vehicle includes a detecting step and a controlling step. The detecting step detects difference in speeds between a front driving shaft and a rear driving shaft. The controlling step controls an apparatus for controlling a distribution ratio of driving torque of the four wheel drive vehicle so as to harmonize the difference in the speeds with a desired value.

5 Claims, 16 Drawing Sheets

METHOD OF CONTROLLING A FOUR WHEEL DRIVE VEHICLE

This is a division of application Ser. No. 07/083,847 filed Aug. 10, 1987, issued as U.S. Pat. No. 4,884,653 on Dec. 5, 1989.

BACKGROUND OF THE INVENTION

The present invention relates to a method for controlling a four wheel drive vehicle. More particularly, the present invention relates to a method for controlling a distribution ratio of driving torque between front wheels and rear wheels, which includes a plurality of continuously variable transmissions.

A conventional four wheel drive includes a wet type clutch disc mechanism located between an output shaft of a transmission and a front differential gear mechanism. When the hydraulic pressure supplied to the wet type clutch disc mechanism is varied, the maximum transmittable torque of the wet type clutch disc mechanism is likewise varied. As a result, the distributed torque to the front wheels is adjustable. A conventional four wheel drive of this type is disclosed, e.g., in a publication "Motor Fan", dated Dec., 1985.

However, the distribution ratio of such conventional four wheel drives can only be changed when the wet type clutch disc mechanism is disengaged. When the wet type clutch disc mechanism is engaged, the conventional four wheel drive cannot change the distribution ratio of driving torque.

Accordingly, when the hydraulic pressure supplied to the clutch disc mechanism is great and a plurality of clutch discs cannot rotate within the clutch disc mechanism, the distribution ratio of the driving torque between the front wheels and the rear wheels becomes one to one.

When a different distribution ratio of driving torque is required, the plurality of clutch discs are allowed to rotate within the clutch disc mechanism. However, such rotation results in problems, such as abrasion or thermal damage of the clutch disc. Further, rotation of the clutch discs results in energy loss, thereby reducing the drive force transmittal line efficiency.

Furthermore, when the hydraulic pressure supplied to the clutch disc mechanism is constant (i.e., the maximum transmittable torque is constant) and the engine torque is increased, the transmitted torque to the front wheels is constant and the transmitted torque to the rear wheels increases. As a result, the distribution ratio of the driving torque varies.

However, in this condition, the maximum transmittable torque should be controlled to maintain a constant value of the distribution ratio of the driving torque. Therefore, the hydraulic pressure supplied to the clutch disc mechanism must be determined by not only the desired distribution ratio of the driving torque but also by the amount of the engine torque. Accordingly, it is complicated to control the hydraulic pressure supplied to the clutch disc mechanism, because the amount of the engine torque changes continuously. Therefore, it is difficult to control the distribution ratio of the driving torque between the front wheels and the rear wheels of the conventional four wheel drive with the wet type clutch disc mechanism.

Japanese Patent Laid Open Sho No. 59-151661 discloses an apparatus for changing the distribution ratio of the driving torque. The disclosed apparatus distributes driving torque of an engine between the front wheels and rear wheels, respectively, through a differential gear mechanism, and includes two continuously variable transmissions transmitting the driving torque, respectively, to both of the front and rear wheels. Accordingly, the apparatus can vary the speed ratio between the front wheels and the rear wheels, and adjust the distribution ratio of the driving torque. The differential gear mechanism of the apparatus absorbs any difference in rotational speed caused by the difference of the speed ratio.

Further, the apparatus includes sensors detecting a driving condition of the vehicle, and controls the distribution ratio of the driving torque in accordance with the detected driving condition. However, the specific method for controlling the distribution ratio of the driving torque in accordance with the detected driving condition is not clearly disclosed.

SUMMARY OF THE INVENTION

The present invention was developed in view of the foregoing background to overcome the foregoing drawbacks. It is accordingly, an object of the invention to provide a method for accurately controlling a distribution ratio of driving torque between front and rear wheels of a four wheel drive vehicle.

To achieve accurate control of the distribution ratio of the driving torque, the four wheel drive vehicle includes an apparatus for controlling the distribution ratio of the driving torque. Further, the apparatus includes a differential gear mechanism, and first and second continuously variable transmissions. The differential gear mechanism receives output torque from an engine of the vehicle, and distributes the output torque into two output torque lines. The first continuously variable transmission is located in one of the two output torque lines and is connected to the differential gear mechanism. The first continuously variable transmission transmits a first amount of the output torque to a front driving shaft of the vehicle. The second continuously variable transmission is located in the other of the two output torque lines and is connected to the differential gear mechanism. The second continuously variable transmission transmits a second amount of the output torque to a rear driving shaft of the vehicle.

Furthermore, the method for controlling the distribution ratio of the driving torque includes a detecting step and a controlling step. The detecting step detects the difference in the rotational speed of the front driving shaft and the rear driving shaft. The controlling step controls the apparatus to control the distribution ratio of the driving torque so as to harmonize the difference in the speed to equal a desired value.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements.

DETAILED DESCRIPTION OF THE PREFERRED EMBODIMENTS

The present invention will be described in detail with reference to the accompanying drawings which illustrate preferred embodiments according to the present invention.

Figure 1:
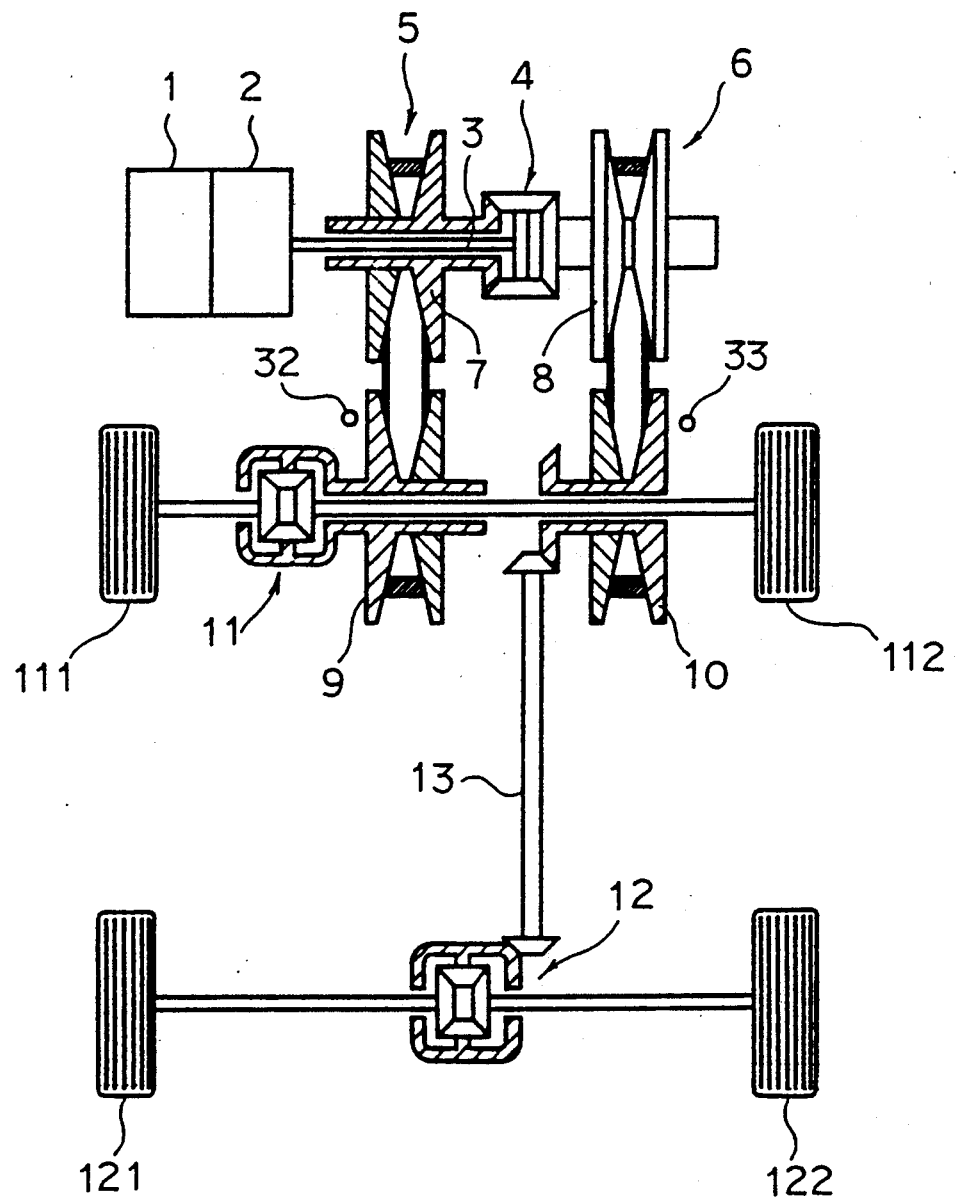
FIG. 1 is a schematic structure of a four wheel drive system to which the present invention is applied.

Referring to FIG. 1, a four wheel drive vehicle includes an engine 1, a transmission 2, and first and second continuously variable transmissions 5 and 6. The transmission 2 includes an output shaft 3. A center differential gear mechanism 4 is connected to the output shaft 3 and input pulleys 7 and 8 of the first and second continuously variable transmissions 5 and 6. Engine torque is transmitted to and divided by the center differential gear mechanism 4. When there is a difference of speed ratio between the first and second continuously variable transmissions 5 and 6, the driving torque is divided in accordance with an inverted value of the speed ratio of the first and second continuously variable transmissions 5 and 6 (i.e., when the speed ratio of the first continuously variable transmission 5 is "eF" and the speed ratio of the second continuously variable transmission 6 is "eR", the ratio of front and rear driving torque is "eR" to "eF").

In this condition, since there is a difference between the speed ratios of the first and second continuously variable transmissions 5 and 6, the rotational speed of the input pulleys 7 and 8 of the continuously variable transmissions 5 and 6 varies. However, the difference in rotational speed is absorbed by the center differential gear mechanism 4. The first and second continuously variable transmissions 5 and 6 include output pulleys 9 and 10 and transmitting belts, respectively. One of the transmitting belts is spanned between the input and output pulleys 7 and 9 of the first continuously variable transmission 5. The other of the transmitting belts is spanned between the input and output pulleys 8 and 10 of the second continuously variable transmission 6. Accordingly, the driving torque is transmitted from the input pulley 7 or 8 to the output pulley 9 or 10.

The output pulley 9 is connected to a front differential gear mechanism 11, and the driving torque transmitted to the output pulley 9 is divided by the front differential gear mechanism 11. Accordingly, front wheels 111 and 112 are driven by the transmitted driving torque.

The output pulley 10 engages with a propeller shaft 13 which engages with a rear differential gear mechanism 12. Accordingly, the divided torque transmitted to the output pulley 10 is transmitted to the rear differential gear mechanism 12 through the propeller shaft 13, and the transmitted torque is divided by the rear differential gear mechanism 12. Thus, rear wheels 121 and 122 are driven by the transmitted driving torque.

Further, a first sensor 32 is located adjacent to the output pulley 9 and detects the rotational speed of the output pulley 9. A second sensor 33 is located adjacent to the output pulley 10 and detects the rotational speed of the output pulley 10.

Figure 2:
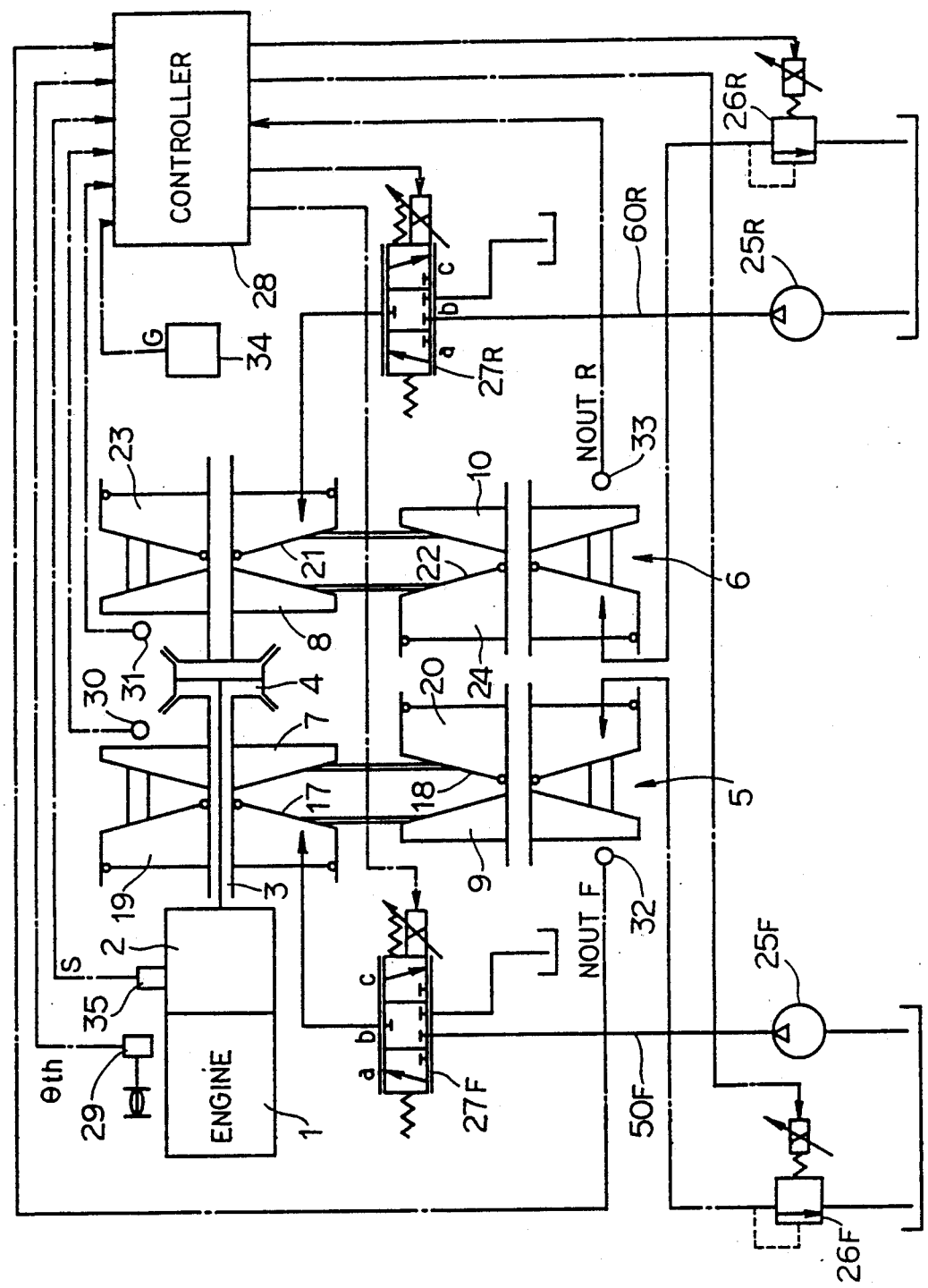
FIG. 2 is a schematic structure of a controlling system for controlling two continuously variable transmissions of the four wheel drive system.

As shown in FIG. 2, the four wheel drive vehicle according to the present invention includes a control system for controlling the first and second continuously variable transmissions 5 and 6. The input pulley 7 includes a movable member 17, displaced by the hydraulic pressure supplied to an input shaft hydraulic cylinder 19. The output pulley 9 includes a movable member 18, displaced by the hydraulic pressure supplied to an output shaft hydraulic cylinder 20.

A pump 25F is actuated by the engine 1 and a pressure regulation valve 26F controls hydraulic line pressure "$P_LF$" of a front hydraulic line 50F. The hydraulic line pressure "$P_LF$" is supplied to the output shaft hydraulic cylinder 20 to prevent the belt from slipping on the input and output pulleys 7 and 9. The hydraulic line pressure "$P_LF$" is also supplied to a flow control valve 27F, which controls the necessary amount of oil supplied to the input shaft hydraulic cylinder 19. The flow control valve 27F is a three position valve, i.e., positions "a", "b" and "c". When the flow control valve 27F is positioned at the "a" position, the hydraulic line pressure "$P_LF$" is supplied to the input shaft hydraulic cylinder 19. When the flow control valve 27F is positioned at the "b" position, there is no communication between the input shaft hydraulic cylinder 19 and the front hydraulic line 50F. When the flow control valve 27F is positioned at the "c" position, the oil is drained from the input shaft hydraulic cylinder 19. Accordingly, the first continuously variable transmission 5 can set a desired speed ratio.

In a similar manner, the input and output pulleys 8 and 10 include movable members 21 and 22 and hydraulic cylinders 23 and 24. A pump 25R is actuated by the engine 1 and a pressure regulation valve 26R controls the hydraulic line pressure "$P_LF$" of a rear hydraulic line 60R. The hydraulic line pressure "$P_LR$" is supplied to a flow control valve 27R. The second continuously variable transmission 6 also sets a desired speed ratio.

The hydraulic pressure regulation valves 26F and 26R and the flow control valves 27F and 27R are solenoid valves which are actuated by output signals from a controller 28.

The controller 28 receives input signals outputted from a throttle opening sensor 29, first through fourth speed sensors 30, 31, 32 and 33, an acceleration sensor 34 and a shift position sensor 35. The throttle opening sensor 29 detects a throttle opening "$\theta$th". The first sensor 32 detects the rotational speed "$N_{out}F$" of the output shaft of the first continuously variable transmission 5. The second sensor 33 detects the rotational speed "$N_{out}R$" of the output shaft of the second continuously variable transmission 6. The third sensor 30 detects the rotational speed "$N_{in}F$" of the input shaft of the first continuously variable transmission 5. The fourth sensor 31 detects the rotational speed "$N_{in}R$" of the input shaft of the second continuously variable transmission 6. The acceleration sensor 34 detects an acceleration "G" and an inclination of the vehicle. The shift position sensor 35 detects a shift position "S" of the transmission 2.

Since the load ratio between the front and rear wheels is changed by not only the acceleration "G" of the vehicle but also the inclination of the vehicle, the acceleration sensor 34 detects not only the acceleration "G" of the vehicle but also the inclination of the vehicle. Namely, the acceleration "G" as detected by the sensor 34 reflects the angle of inclination of the vehicle. The controller 28 includes a central processing unit "CPU", a read only memory "ROM" and a random access memory "RAM". The read only memory "ROM" memorizes programs, so that the controller 28 receives the input signals and the output signals in accordance with the memorized programs.

Figure 3:
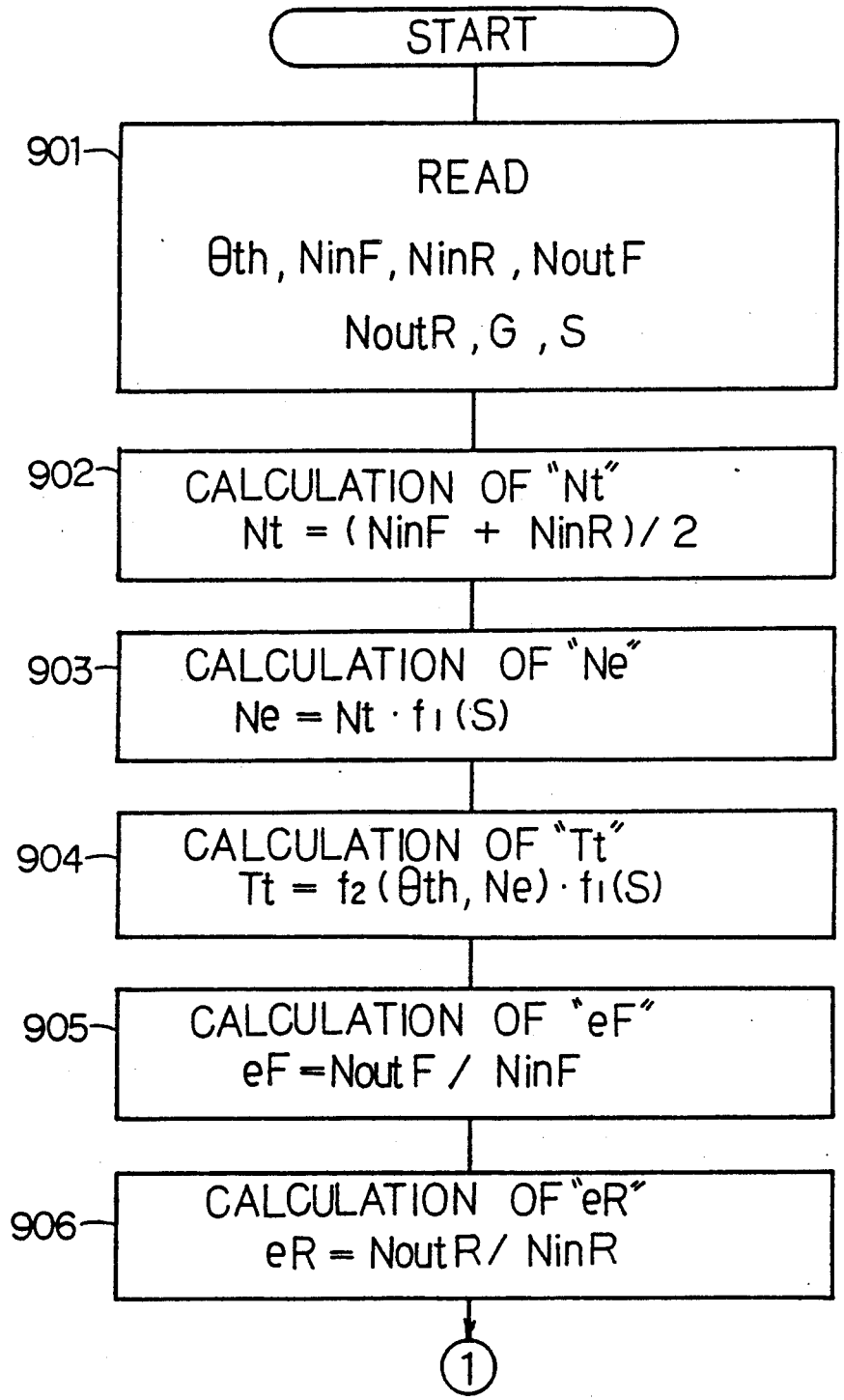
FIG. 3 is a first part of a flow chart for controlling two continuously variable transmissions.
Figure 4:
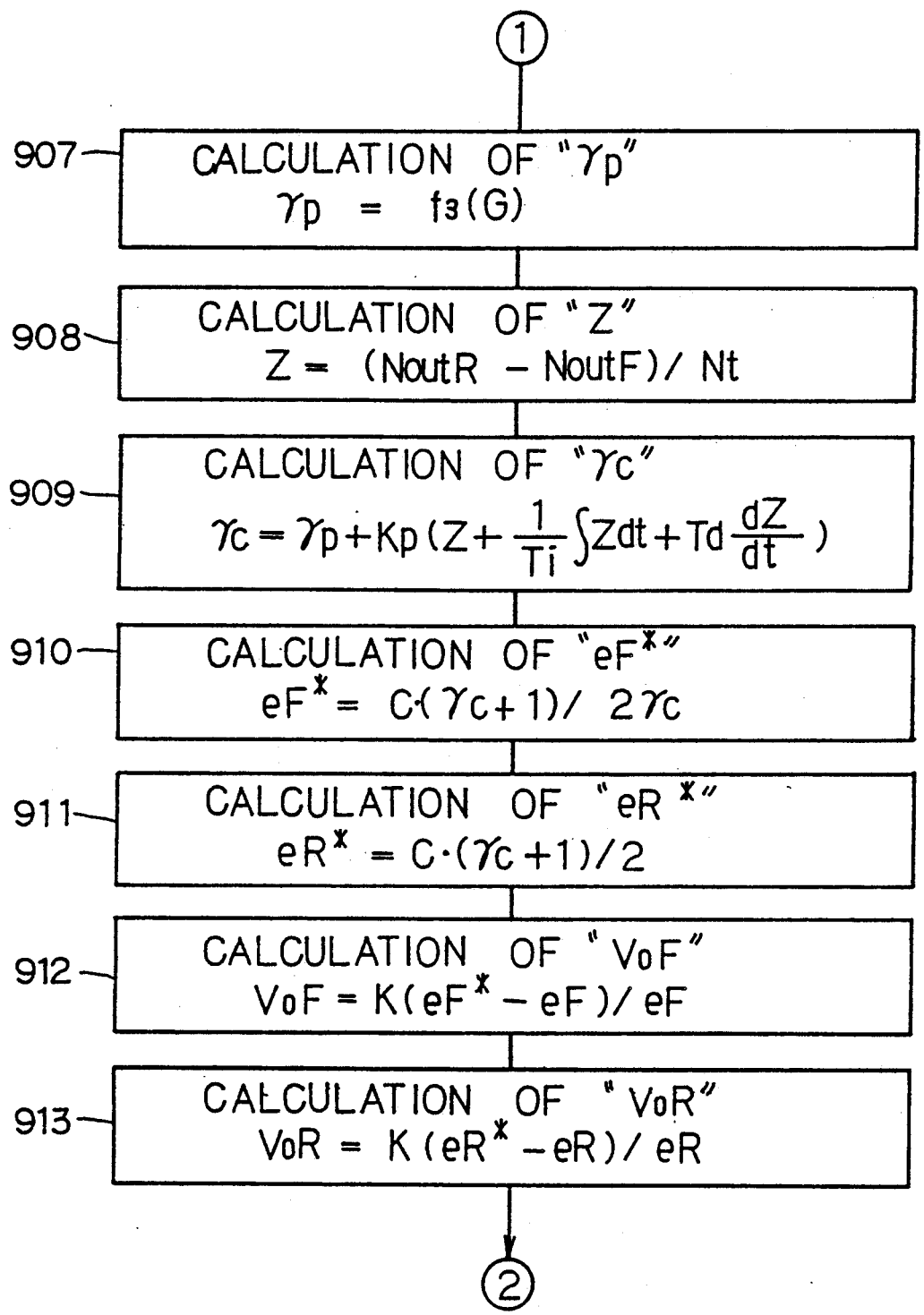
FIG. 4 is a second part of the flow chart.
Figure 5:
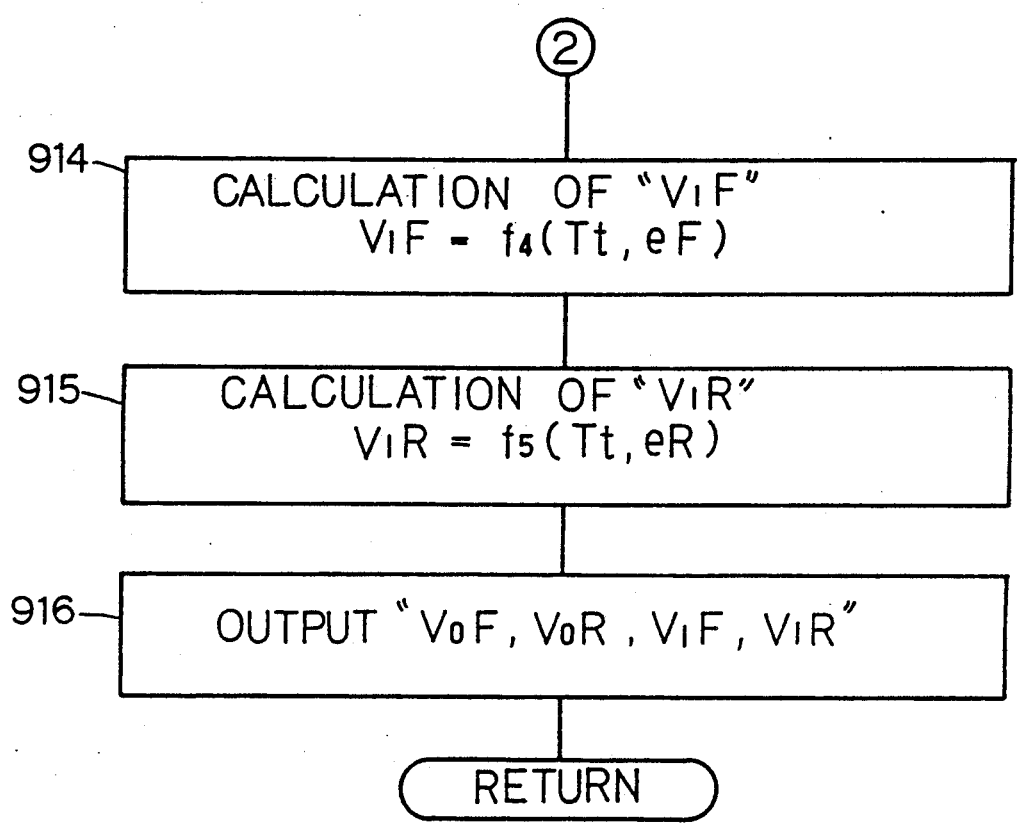
FIG. 5 is a third part of the flow chart.

FIGS. 3, 4 and 5 show a flow chart for controlling a distribution ratio of driving torque between the front wheels 111 and 112 and the rear wheels 121 and 122.

At step 901, the throttle opening "$\theta th$", the speed "$N_{in}F$" of the input shaft of the first continuously variable transmission 5, the speed "$N_{in}R$" of the input shaft of the second continuously variable transmission 6, the speed "$N_{out}F$" of the output shaft of the first continuously variable transmission 5, the speed "$N_{out}R$" of the output shaft of the second continuously variable transmission 6, the acceleration "G" of the vehicle (which reflects; the inclination of the vehicle) and the shift position "S" of the transmission 2 are read. In this embodiment according to the present invention, the speed "$N_{out}F$" of the output shaft is the speed of the front wheels 111 and 112, and the speed "$N_{out}R$" of the output shaft is the speed of the rear wheels 121 and 122.

After the step 901, a step 902 is processed. At step 902, the output shaft speed "Nt" of the transmission 2 is calculated. Since the output shaft torque "Nt" is divided by the center differential gear mechanism 4, and transmitted to both of the first and second continuously variable transmissions 5 and 6, the output shaft speed "Nt" is calculated by a first formula (1), as follows:

$$Nt = (N_{in}F + N_{in}R)/2 \quad (1)$$

After the step 902, a step 903 is processed. At step 903, the engine speed "Ne" is calculated in accordance with the calculated output shaft speed "Nt" and the shift position "S" of the transmission 2 by a second formula (2) as follows:

$$Ne = Nt \cdot f_1(S) \quad (2)$$

wherein $f_1(S)$ represents a total reduction ratio of the transmission 2, which is determined in accordance with the detected shift position "S".

After the step 903, a step 904 is processed. At step 904, the output shaft torque "Tt" of the transmission is calculated in accordance with the detected throttle opening "$\theta th$", the calculated engine speed "Ne" and the detected shift position "S" by a third formula (3) as follows:

$$Tt = f_2(\theta th, NE) \cdot f_1(S) \quad (3),$$

wherein "$f_2(\theta th, Ne)$" represents the engine torque calculated in accordance with a relationship memorized in the read only memory "ROM" of the controller 28. The output shaft torque "Tt" of the transmission 2 is calculated by multiplication of the calculated engine torque "$f_2(\theta th, Ne)$" by the total reduction ratio "$f_1(S)$".

After the step 904, a step 905 is processed. At step 905, the actual speed ratio "eF" of the first continuously variable transmission 5 is calculated in accordance with the input shaft speed "$N_{in}F$" and the output shaft speed "$N_{out}F$" of the first continuously variable transmission 5 by a fourth formula (4) as follows:

$$eF = N_{out}F/N_{in}F \quad (4).$$

After the step 905, a step 906 is processed. At step 906, the actual speed ratio "eR" is calculated in accordance with the input shaft speed "$N_{in}R$" and the output shaft speed "$N_{out}R$" of the second continuously variable transmission 6 by a fifth formula (5) as follows:

$$eR = N_{out}R/N_{in}R \quad (5).$$

After the step 906, a step 907 is processed. At step 907, a preprogram value "$\gamma p$" of a desired distribution ratio of the driving torque between the front and rear wheels (i.e., the front wheel torque/the rear wheel torque) is calculated in accordance with the acceleration detected "G" which reflects, the inclination of the vehicle) by a sixth formula (6) as follows:

$$\gamma p = f_3(G) \quad (6).$$

The load ratio between the front and rear wheels is estimated in accordance with the acceleration and the inclination of the vehicle, and the load ratio is used as the preprogram item "$\gamma p$" of the distribution ratio of the driving torque. "$\gamma p$" thus represents a prospective value of an optimum distribution ratio at a given time.

A significant advantage of the controlling method of the present invention is obtained through the use of the detected acceleration "G". When a conventional four wheel drive vehicle accelerates suddenly, the load on the rear wheels becomes greater than that on the front wheels in accordance with magnitude of the acceleration "G". In this condition, the traction of the rear wheels becomes greater than that of the front wheels, because traction of the wheels is proportional to the load on wheels. However, the distribution ratio of driving torque of the conventional four wheel drive vehicle is one-to-one (i.e., the front wheels receive the same amount of the driving torque as the rear wheels), so that when the engine torque becomes greater than the traction of the front wheels, the front wheels slip.

However, the controlling method according to the present invention varies the distribution ratio of the driving torque between the front and rear wheels, so that the torque distributed to; the front wheels can be controlled to decrease, as described later. As a result, the total traction of the front and rear wheels can be increased by an increase the engine torque, without slipping of the front wheels. Therefore, the controlling method of the present invention most efficiently uses the engine torque. Further, the load ratio between the front and rear wheels is varied by not only the acceleration "G" of the vehicle but also the inclination of the vehicle.

After the step 907, at step 908, a difference ratio "Z" of the speeds between the front and rear wheels is calculated in accordance with the detected speeds "$N_{out}F$" and "$N_{out}R$" of the output shafts of the continuously variable transmissions 5 and 6 and the calculated output shaft speed "Nt" of the transmission 2 by a seventh formula (7), as follows:

$$Z = (N_{out}R - N_{out}F)/Nt \qquad (7).$$

The difference in the speeds "$N_{out}R - N_{out}F$" is divided by the output shaft speed "Nt" since a feedback item (discussed below) "$Kp\{Z+(\int Zdt)/Ti+Td(dZ/dt)\}$" of the desired distribution ratio of the driving torque is greatly influenced by the output shaft speed "Nt".

After the step 908, a step 909 is processed. At step 909, the desired distribution ratio "γc" of the driving torque is calculated in accordance with the calculated preprogram value "γp" and the calculated feedback item "$Kp\{Z+(\int Zdt)/Ti+Td(dZ/dt)\}$" by an eighth formula (8), as follows:

$$\gamma c = \gamma p + Kp\{Z+(\int Zdt)/Ti+Td(dZ/dt)\} \qquad (8),$$

wherein "Kp" is experimentally determined and represents the proportional gain, "Ti" represents the integral time constant, and "Td" represents the differential or derivative time constant. Formula (8) operates to compensate the prospective or preprogram value "γp" by the feedback item. Accordingly, if the preprogram value is close to the optimum value, the feedback item becomes very small. The proportional gain "Kp" is selected so that "γp" is compensated as quickly as possible without causing excessive instability in the value of "γc".

When there is a difference in speeds between the front and rear wheels, the feedback item is influenced by the proportional gain action item "Kp·Z". As a result, the speed of the front wheels is corrected to approach the speed of the rear wheels by adjusting "γc" in each control loop.

Further, when there is a difference in the speeds between the front and rear wheels, the integral control action item "$(\int Zdt)/Ti$" facilitates the adjustment of the speed difference by compensating "γc" in each control loop.

Furthermore, the differential (or derivative) control action item "Td(dZ/dt)" functions to reconcile the speed of the front wheels with the speed of the rear wheels quickly, or to stabilize and decrease the variation of an amount to be controlled quickly. Accordingly, in the eighth formula (8), the distribution ratio "γc" of the driving torque is varied in each control loop.

Steps 910 through 916 reconcile the actual distribution ratio of the driving torque with the desired distribution ratio "γc" of the driving torque. An actual distribution ratio of the driving torque approaches the desired distribution ratio "γc" of the driving torque in each control loop by the feedback function of the eighth formula (8).

For example, when a greater amount of the driving torque is biassed on the rear wheels (i.e., the rear wheels slip more than the front wheels), the difference ratio "Z" of the speed between the front and rear wheels has a positive value. Accordingly, because "$N_{out}R$">"$N_{in}F$", the desired distribution ratio "γc" of the driving torque is increased in accordance with the eighth formula (8) in each control loop. The desired distribution ratio "γc" of the driving torque is compensated to increase the driving torque of the front wheels. Accordingly, the slip of the rear wheels is reduced, and as a result, "$N_{out}R$" approaches "$N_{out}F$", until the desired distribution ratio "γc" of the driving torque is achieved.

On the other hand, when the front wheels slip more than the rear wheels (i.e., $N_{out}R < N_{out}F$), the difference ratio "Z" of the speeds between the front and rear wheels has a negative value. The desired distribution ratio "γc" of the driving torque is decreased in accordance with the eighth formula (8) in each control loop, so that the driving torque of the rear wheels is increased and the driving torque of the front wheels is decreased.

Accordingly, as the desired distribution ratio "γc" is approached, the slip of the front wheels is reduced. The steps 908 and 909 reduce the driving torque of one of the front and rear wheels which has the greater speed and more slippage and increases the driving torque of the other of the front and rear wheels. Steps 908 and 909 thus function as the feedback to equalize the speeds of the front and rear wheels. When the speed of the front wheels is reconciled with the speed of the rear wheels, the wheels generate minimum loss and maximum traction.

After the step 909, a step 910 is processed. At the step 910, a desired speed ratio "eF*" of the first continuously variable transmission 5 is calculated in accordance with the desired distribution ratio "γc" of the driving torque by a ninth formula (9) as follows:

$$eF^* = C\cdot(\gamma c+1)/2\gamma c \qquad (9).$$

After the step 910, a step 911 is processed. At the step 911, a desired speed ratio "eR*" of the second continuously variable transmission 6 is calculated in accordance with the desired distribution ratio "γc" of the driving torque by a tenth formula (10) as follows:

$$eR^* = C\cdot(\gamma c+1)/2 \qquad (10).$$

The ninth and tenth formulas (9) and (10) are derived as set forth below. The distribution ratio "γ" of the driving torque is calculated by an eleventh formula (11) as follows:

$$\gamma = T_{out}F/T_{out}R = (eR\cdot T_{in}F)/(eF\cdot T_{in}R) \qquad (11),$$

wherein "$T_{in}F$" represents the input torque of the first continuously variable transmission 5, "$T_{in}R$" represents the input torque of the second continuously variable transmission 6, "$T_{out}F$" represents the output torque of the first continuously variable transmission 5, and "$T_{out}R$" represents the output torque of the second continuously variable transmission 6.

Since the input torque "$T_{in}F$" and the input torque "$T_{in}R$" are equally divided by the center differential gear mechanism 4 (i.e., $T_{in}F = T_{in}R$), the distribution ratio "γ" of the driving torque is calculated by a twelfth formula (12) as follows:

$$\gamma = eR/eF \qquad (12),$$

wherein "eR" and "eF" are the actual speed ratios.

Accordingly, when one of the actual speed ratios "eR" and "eF" is determined and the distribution ratio "γ" of the driving torque is determined, the other of the actual speed ratios "eR" and "eF" can be calculated by the formula (12).

However, in the above-mentioned calculation method of the actual speed ratios "eF" and "eR", the reduction ratio of the vehicle varies, when the distribution ratio "γ" of the driving torque is varied. Accordingly, it is undesirable to control two continuously variable transmissions 5 and 6 in accordance with the above mentioned method.

The desired distribution ratio "γc" can be calculated for a constant vehicle reduction ratio of the vehicle by formulas (13) through (16), as follows:

$$Nt = (N_{in}F + N_{in}R)/2 = \{(N_{out}F/eF) + (N_{out}R/eR)\}/2 \quad (13),$$

wherein the formula (13) is derived from the formulas (1), (4) and (5).

When the speed of the front wheels is equal to the speed of the rear wheels (i.e., $N_{out}F = N_{out}R = N_{out}$), the formula (13) is modified as follows:

$$Nt = \{(1/eF) + (1/eR)\} \times N_{out}/2 = (eF + eR)N_{out}/(2eF \cdot eR) \quad (14).$$

Further, the actual vehicle speed ratio is thus calculated as follows:

$$N_{out}/Nt = 2eF \cdot eR/(eF + eR) \quad (15).$$

When the actual speed ratio "eF" or "eR" is varied to change the distribution ratio "γ" of the driving torque, the value of "$N_{out}/Nt$" should be maintained constant (i.e., $N_{out}/Nt = $"C", and "C" is a constant value) to ensure no variation in the vehicle reduction ratio.

In this condition, the speed ratios "eF" and "eR" are controlled by a sixteenth formula (16) as follows:

$$C = 2eF \cdot eR/(eF + eR) \quad (16).$$

Accordingly, the formulas (9) and (10) are derived from the formulas (12) and (16) by solving for the desired respective speed ratios "eR*" and "eF*", for a given desired distribution ratio "γc". Therefore, when the distribution ratio "γc" of the driving torque is calculated, the desired speed ratios "eF*" and "eR*" are calculated by the formulas (9) and (10). When the two continuously variable transmissions 5 and 6 are controlled in accordance with the desired speed ratio "eF*" and "eR*", the desired distribution ratio "γc" of the driving torque is achieved without any variation of the reduction ratio of the vehicle.

After the step 911, a step 912 is processed. At step 912, first control value "VoF" of the flow control valve 27F is calculated by a seventeenth formula (17), as follows:

$$VoF = K(eF^* - eF)/eF \quad (17),$$

wherein "eF*−eF" represents difference value between the desired speed ratio "eF*" of the first continuously variable transmission 5 and an actual speed ratio "eF".

The flow control valve 27F receives a signal having the first control value "VoF", and functions to reconcile the actual value "eF" with the desired speed ratio "eF*".

In a similar manner to the step 912, a step 913 calculates second control value "VoR" of the flow control valve 27R by an eighteenth formula (18), as follows:

$$VoR = K(eR^* - eR)/eR \quad (18).$$

The flow control valve 27R receives a signal having the second control value "V₀R", and functions to reconcile the actual value "eR" with the desired speed ratio "eR*".

After the step 913, a step 914 calculates third control value "V₁F" of the pressure control valve 26F of the first continuously variable transmission 5 in accordance with an output torque "Tt" of the transmission 2 and the actual speed ratio "eF" by the nineteenth formula (19), as follows:

$$V_1F = f_4(Tt, eF) \quad (19),$$

wherein the third control value "V₁F" is a function of the output torque "Tt" and the actual speed ratio "eF".

Accordingly, the pressure control valve 26F controls the hydraulic pressure to be supplied to the hydraulic cylinder 20 in accordance with the third control value "V₁F". As a result, the first continuously variable transmission 5 transmits the torque without any slip of the belt.

In a similar manner to the step 914, a step 915 calculates a fourth control value "V₁R" of the pressure control valve 26R of the second continuously variable transmission 6 in accordance with the output shaft torque "Tt" and the actual speed ratio "eR" by the twentieth formula (20), as follows:

$$V_1R = f_5(Tt, eR) \quad (20).$$

Accordingly, the pressure control valve 26R controls the hydraulic pressure to be supplied to the hydraulic cylinder 24 in accordance with the fourth control value "V₁R". As a result, the second continuously variable transmission 6 transmits the torque without any slip of the belt.

After the step 915, a step 916 outputs the first through fourth control values "VoF", "VoR", "V₁F" and "V₁R".

The operation of the first embodiment mentioned above is discussed below.

When the distribution ratio of the driving torque is not adequate during a driving condition on a low-traction road (e.g., when the engine 1 outputs a high torque during driving conditions on a snowy road), one of the front and rear wheels slips more than the other of the front and rear wheels. In this condition, the total traction of the vehicle is less than that during no slip conditions of the vehicle.

The distribution ratio of the driving torque is controlled to reduce the slippage of one of the front and rear wheels (i.e., the driving torque is transmited from the one of the front and rear wheels which slips more to the other of the front and rear wheels in accordance with the difference in speed between the front and rear wheels).

Accordingly, even when the load conditions of the vehicle or the road conditions change, the controlling system controls the two continuously variable transmissions 5 and 6 to reduce the difference in speed of the front and rear wheels by the feedback method mentioned above. As a result, the distribution ratio of the driving torque is controlled to generate the maximum traction.

A second embodiment of the present invention includes a first alternative step instead of the step 908 of the first embodiment. The first alternative step includes a formula (71) as follows:

$$Z=(N_{out}R-N_{out}F)/Nt-\epsilon \quad (71).$$

wherein "$\epsilon$" represents the desired difference in speed of the revolution numbers between the front and rear wheels. Accordingly, one of the front and rear wheels slips "$\epsilon$" greater than the other of the front and rear wheels during driving of the vehicle. In certain driving conditions, controlling of the two continuously variable transmissions 5 and 6 in accordance with the method of the second embodiment improves the drivability of the vehicle.

A third embodiment of the present invention includes a second alternative step instead of the step 909 of the first embodiment. The second alternative step includes a formula (81), as follows:

$$\gamma c=\gamma p+f(Nt)\{Z+1/f(Nt)\int Zdt+f(Nt)dz/dt\} \quad (81)$$

wherein f(Nt) represents a function of the output shaft speed "Nt" of the transmission 2.

Accordingly, the difference in speeds of the front and rear wheels is influenced by the vehicle speed when the two continuously variable transmissions 5 and 6 are controlled in accordance with the method of the third embodiment.

A fourth embodiment of the present invention includes a third alternative step instead of the step 909 of the first embodiment. The third alternative step includes either formulas (82) or (83) as follows:

$$\gamma c=1+Kp\{Z+(\int Zdt)/Ti+Td(dZ/dt)\} \quad (82)$$

$$\gamma c=A^{KZ} \quad (83),$$

wherein "A" is a value greater than one. "A" and "K" are constants which may be experimentally determined.

These formulas (82) and (83) do not include any preprogram value, so that the control system of the two continuously variable transmissions 5 and 6 does not require an acceleration sensor 34. Formula (82) includes "1" instead of "$\gamma p$", because the distribution ratio in normal conditions is generally close to 1.

A fifth embodiment of the present invention includes one of a fluid coupling and an automatic transmission including a torque converter. The fifth embodiment further includes an engine speed sensor in order to determine an output torque "Tt" of the fluid coupling or the automatic transmission. Furthermore, the fifth embodiment includes an alternative formula (31) instead of the third formula (3) of the step 904 of the first embodiment. The alternative formula (31) is as follows:

$$Tt=F_2(\theta th, Ne) \cdot f(S, Ne, Nt) \quad (31).$$

Figure 6:
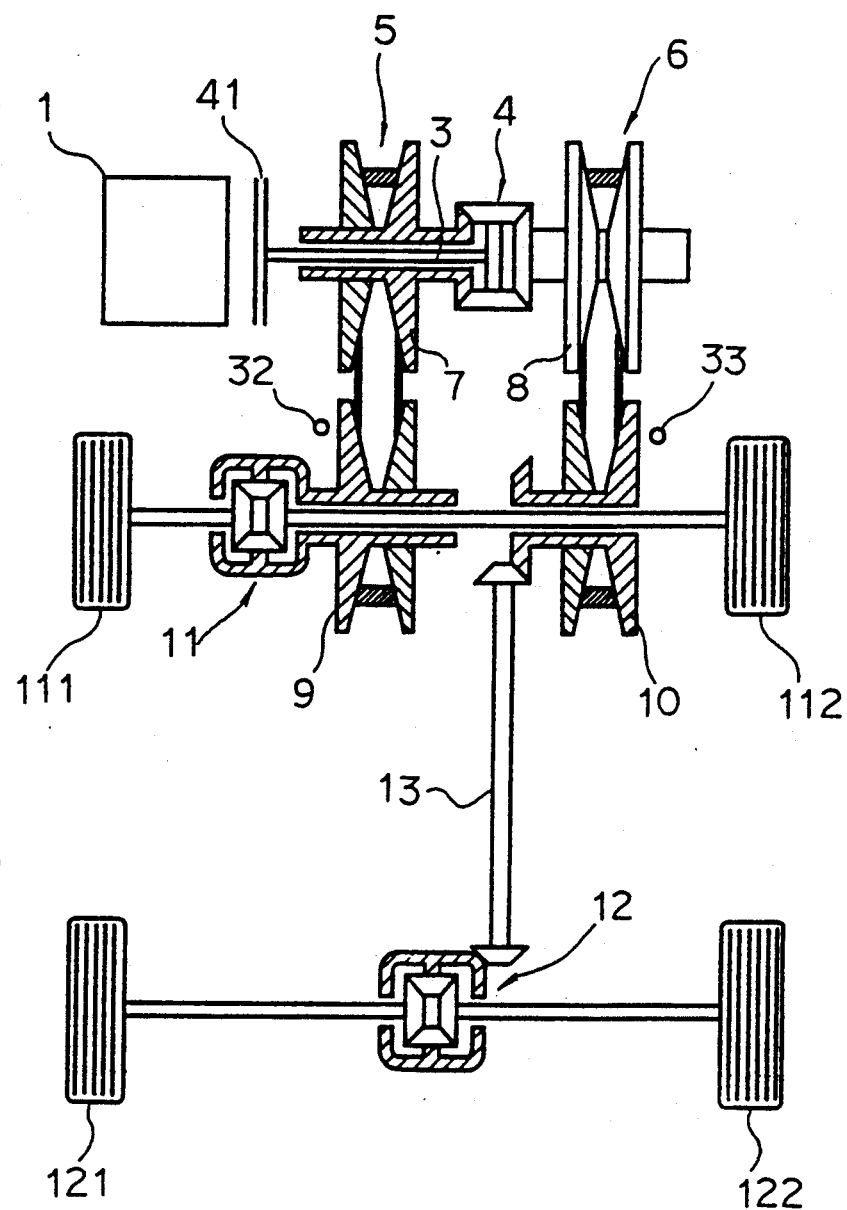
FIG. 6 is a schematic structure of a sixth embodiment of the four wheel drive system.

FIG. 6 shows a sixth embodiment of the present invention. The sixth embodiment includes a clutch 41 instead of the transmission 2 of the first embodiment. The first and second continuously variable transmissions 5 and 6 determine the speed ratio of the vehicle, and determine the desired distribution ratio of the driving torque simultaneously with the desired speed ratios "eF*" and "eR*". The desired distribution ratio of the driving torque may be calculated in accordance with a feedback routine similar to the first embodiment.

Figure 7:
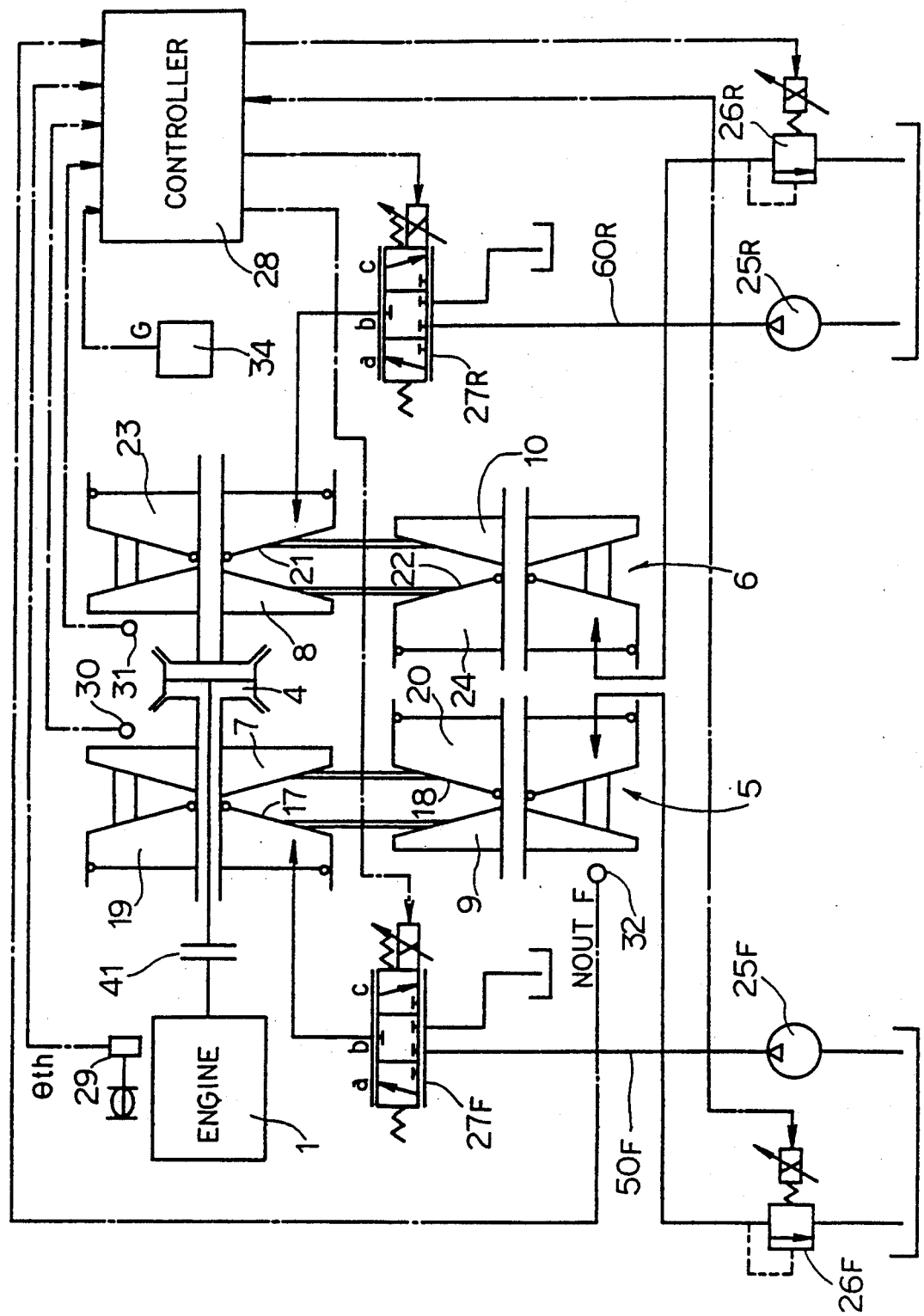
FIG. 7 is a schematic structure of a controlling system for controlling two continuously variable transmissions of the sixth embodiment.

FIG. 7 shows a control system for controlling the first and second continuously variable transmission 5 and 6 of the sixth embodiment. The control system is very similar to that of the first embodiment shown in FIG. 2.

Figure 8:
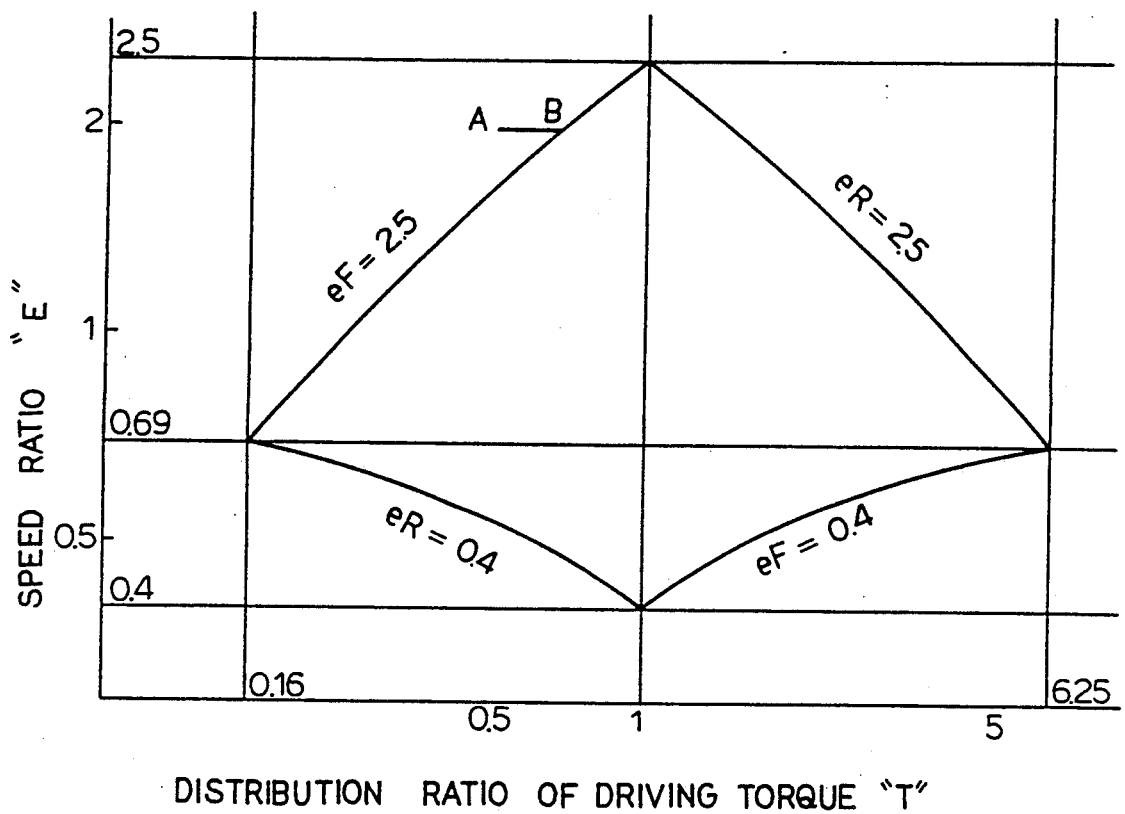
FIG. 8 is a logarithm graph showing a relationship between a speed ratio and a distribution ratio of driving torque.
Figure 9:
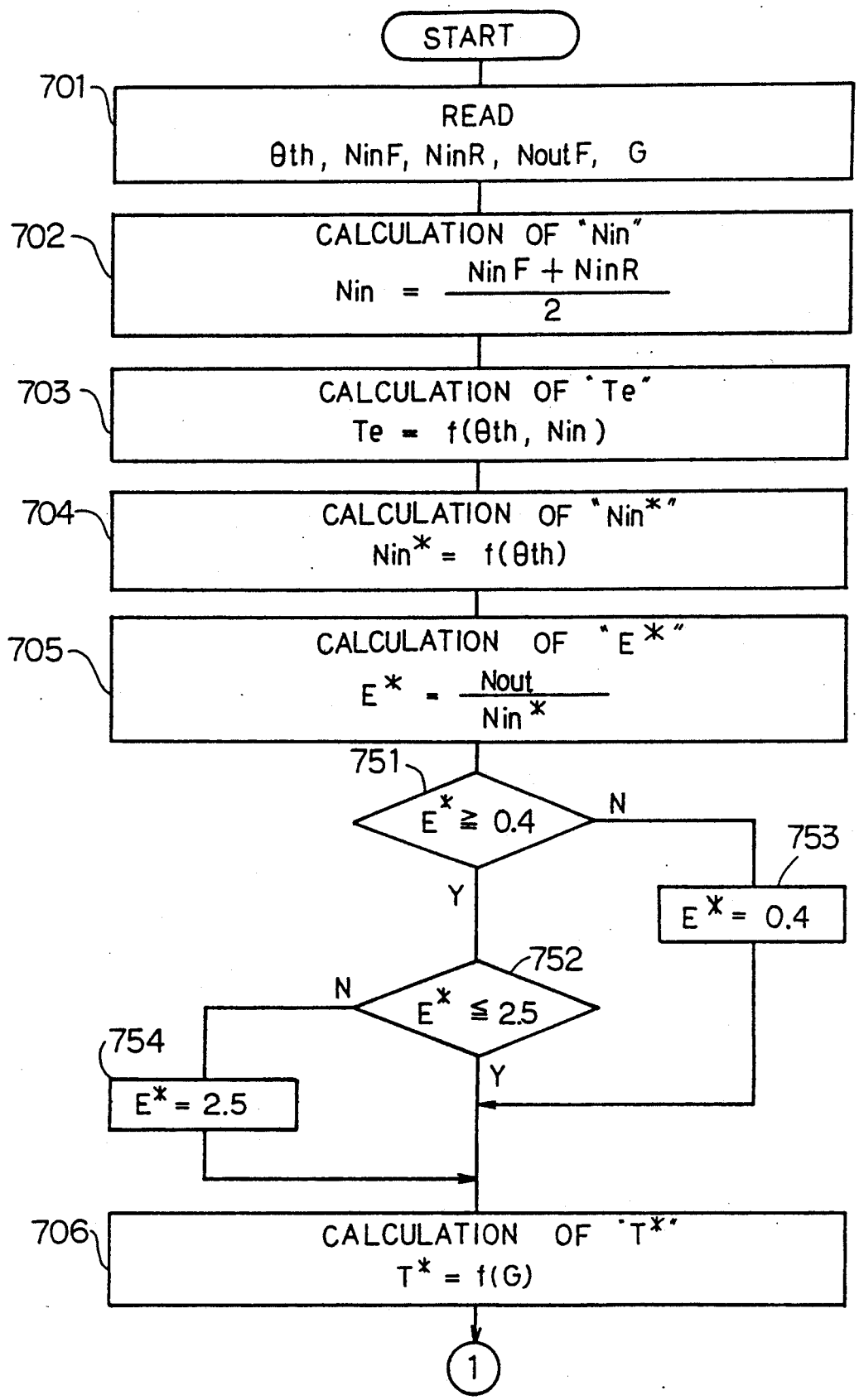
FIG. 9 is a first part of a flow chart for controlling two continuously variable transmissions of the sixth embodiment.
Figure 10:
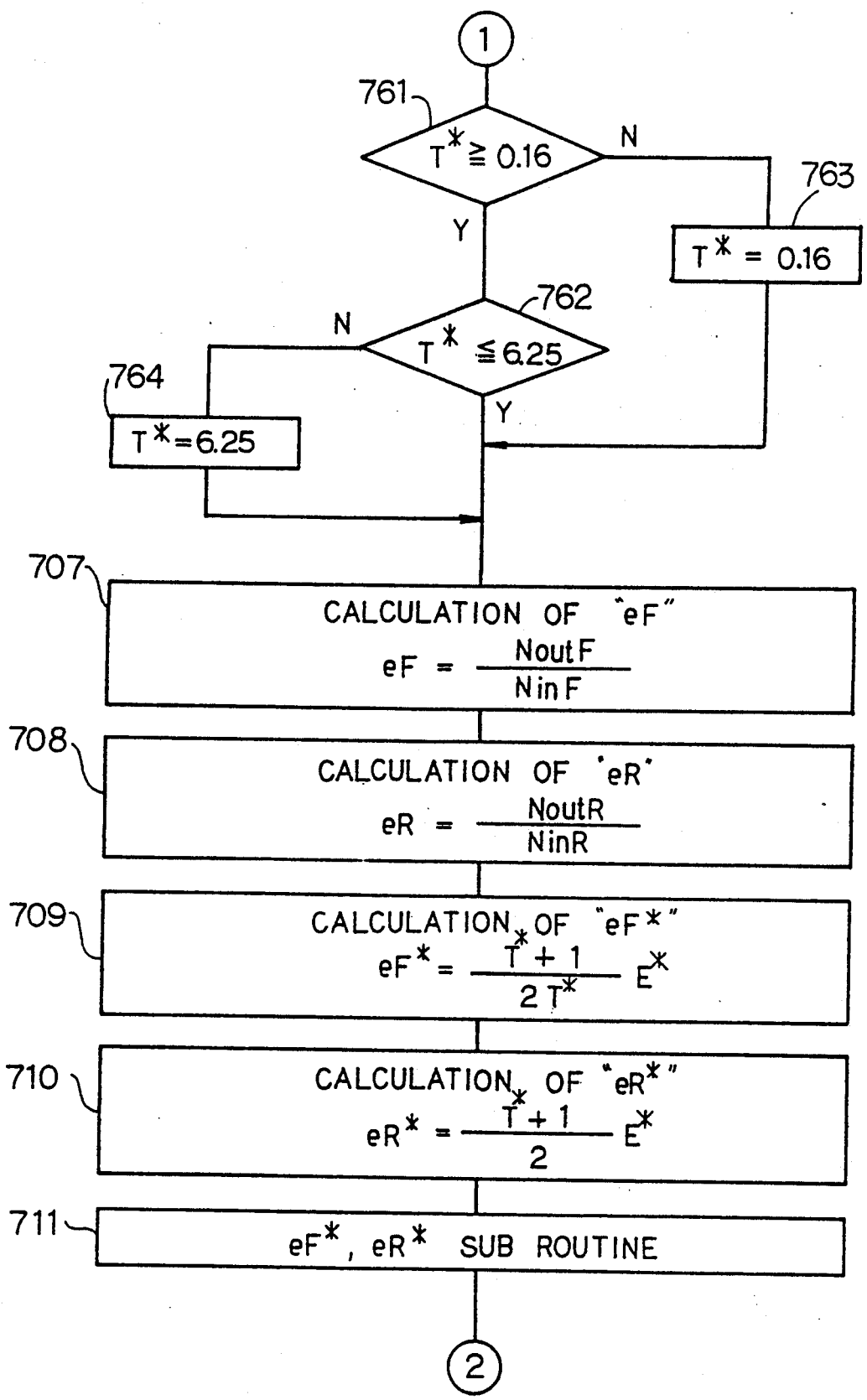
FIG. 10 is a second part of the flow chart.

FIG. 8 shows a logarithmic graph of a relationship between a speed ratio "E" and a distribution ratio "T" of driving torque of the sixth embodiment. "E" represents a total speed ratio of a transmission means of the sixth embodiment and is calculated in formula (101), as follows:

$$E=N_{out}/N_{in} \quad (101),$$

wherein "$N_{in}$" represents a total input shaft revolution speed of the transmission means, "$N_{out}$" represents a total output shaft revolution speed of the transmission means, which is the same as the output shaft revolution speeds of the first and second continuously variable transmissions 5 and 6 (i.e., $N_{out}=N_{out}F=N_{out}R$).

"T" represents a distribution ratio of the driven torque between the front and rear wheels, which is the ratio of the output torque of the first and second continuously variable transmissions 5 and 6 (i.e., $T=T_{out}F/T_{out}R$).

FIG. 8 shows an area which satisfies formulas (102), (103), (104) and (105) as follows:

$$eF=(T+1)E/2T \quad (102)$$

$$eR=(T+1)E/2 \quad (103)$$

$$0.4 \leq eF \leq 2.5 \quad (104)$$

$$0.4 \leq eR \leq 2.5 \quad (105),$$

wherein "eF" represents an actual speed ratio of the first continuously variable transmission 5, and "eR" represents an actual speed ratio of the second continuously variable transmission 6. Formulas (102) and (103) are derivable and represent the respective relationships between "eF" and "eR" and "T" and "E". Both "eF" and "eR" have upper and lower limits defined by formulas (104) and (105). These upper and lower limits may vary in different applications.

Accordingly, when a value of the distribution ratio "T" of driving torque is 1, a value of the total speed ratio "E" of the transmission means is within a maximum area defined between equal to or greater than 0.4 and equal to or less than 2.5. On the other hand, when the value of the distribution ratio "T" of driving torque is less than or greater than 1, the value of the total speed ratio "E" of the transmission means is within a smaller area than the maximum area (e.g., when the value of the distribution ratio "T" is 0.16 or 6.25, the value of the total speed ratio "E" is 0.69).

FIGS. 9, 10, 11 and 12 show a flow chart for controlling two continuously variable transmissions 5 and 6 of the sixth embodiment.

At step 701, the throttle opening "$\theta th$", the speed "$N_{in}F$" of the input shaft of the first continuously variable transmission 5, the speed "$N_{in}R$" of the input shaft of the second continuously variable transmission 6, the speed "$N_{out}F$" of the output shaft of the first continuously variable transmission 5, and the acceleration "G" and the inclination of the vehicle are read.

After the step 701, a step 702 is processed. The step 702 calculates an engine speed "$N_{in}$" (i.e., the input shaft speed of the transmission means). Since the input shaft speed "$N_{in}$" is divided by the center differential gear mechanism 4, and transmitted to both of the first and second continuously variable transmissions 5 and 6, the input shaft speed "$N_{in}$" is calculated by a first formula (106) as follows:

$$N_{in} = (N_{in}F + N_{in}R)/2 \tag{106}$$

After the step 702, a step 703 is processed. The step 703 calculates an engine output torque "Te" in accordance with the detected throttle opening "$\theta$th", and the calculated engine speed "$N_{in}$" by a formula (107) as follows:

$$Te = f(\theta th, N_{in}) \tag{107}$$

wherein f($\theta$th, $N_{in}$) represents the engine output torque "Te", which is calculated in accordance with a relationship memorized in the read only memory "ROM" of a controller 28.

After the step 703, a step 704 is processed. The step 704 calculates a desired input shaft speed "$N_{in}^*$" of the transmission means in accordance with the throttle opening "$\theta$th" by a formula (108) as follows:

$$N_{in}^* = f(\theta th) \tag{108}$$

wherein the desired input shaft speed "$N_{in}^*$" is determined so as to generate the desired engine output torque "Te", corresponding to the throttle opening "$\theta$th", for minimum fuel consumption. A relationship between the throttle opening "$\theta$th" and the desired input shaft speed "$N_{in}^*$" is derived from a minimum fuel consumption ratio curve of the engine 1, and the relationship between "$\theta$th" and "$N_{in}^*$" is memorized in the read only memory "ROM".

After the step 704, a step 705 is processed. The step 705 calculates a desired speed ratio "E*" in accordance with a total output shaft speed "$N_{out}$" of the transmission means and the desired input shaft speed "$N_{in}^*$" by a formula (109) as follows:

$$E^* = N_{out}/N_{in}^* \tag{109}$$

wherein the total output shaft speed "$N_{out}$" of the transmission means is equal to the output shaft speed "$N_{out}F$" of the first continuously variable transmission 5 and the output shaft speed of the second continuously variable transmission 6.

After the step 705, the calculated desired speed ratio "E*" is controlled within a predetermined area (i.e., $0.4 \leq E^* \leq 2.5$) in accordance with steps 751 through 754.

When the desired speed ratio "E*" is achieved, the engine 1 drives at the desired input shaft speed "$N_{in}^*$" and consumes a minimum amount of fuel.

After the steps 751 through 754, a step 706 is processed. The step 706 calculates a desired distribution ratio "T*" of driving torque of the vehicle in accordance with the detected acceleration "G" by a formula (110) as follows:

$$T^* = f(G) \tag{110}$$

wherein a load ratio between the front and rear wheels is estimated in accordance with the acceleration "G" of the vehicle.

After the step 706, the calculated desired distribution ratio "T*" is controlled within a predetermined area (i.e., $0.16 \leq T^* \leq 6.25$) in accordance with steps 761 through 764.

When a conventional four wheel drive vehicle accelerates suddenly, the load on the rear wheels becomes greater than that on the front wheels in accordance with the magnitude of the acceleration "G". Accordingly, the control method of the present invention advantageously uses the detected acceleration "G" in calculating the desired distribution ratio. In this condition, the traction of the rear wheels is greater than that of the front wheels, because traction is proportional to the load on the wheel.

The distribution ratio of driving torque of conventional four wheel drive vehicles is 1 (i.e., the front wheels receive the same amount of the driving torque as that of the rear wheels), so that when the engine torque is greater than the traction of the front wheels, the front wheels slip.

However, the control method of the present invention can vary the distribution ratio of driving torque between the front and rear wheels, so that the load on the front wheels is controlled to increase. As a result, the traction of the front wheels increases and the front wheels are prevented from slipping. Therefore, the controlling method according to the present invention uses the engine torque most efficiently.

Further, the load ratio between the front and rear wheels is varied not only with acceleration "G" of the vehicle, but also with the inclination of the vehicle. Accordingly, it is apparent that the desired distribution ratio "T*" of driving torque may be calculated in accordance with the acceleration "G" and the inclination of the vehicle.

After the steps 761 through 764, a step 707 is processed. The step 707 calculates the actual speed ratio "eF" of the first continuously variable transmission 5 in accordance with the input shaft speed "$N_{in}F$" and the output shaft speed "$N_{out}F$" of the first continuously variable transmission 5 by a formula (111) as follows:

$$eF = N_{out}F/N_{in}F \tag{111}$$

After the step 707, a step 708 is processed. The step 708 calculates the actual speed ratio "eR" in accordance with the input shaft speed "$N_{in}R$" and the output shaft speed "$N_{out}R$" of the second continuously variable transmission 6 by a formula (112) as follows:

$$eR = N_{out}R/N_{in}R \tag{112}$$

After the step 708, a step 709 is processed. The step 709 calculates a desired speed ratio "eF*" of the first continuously variable transmission 5 in accordance with the total speed ratio "E*" of the transmission means and the distribution ratio "T*" of the driving torque by a formula (113) as follows:

$$eF^* = (T^* + 1)E^*/2T^* \tag{113}$$

After the step 709, a step 710 calculates a desired speed ratio "eR*" of the second continuously variable transmission 6 in accordance with the total speed ratio "E*" of the transmission means and the distribution ratio "T*" of the driving torque by a formula (114) as follows:

$$eR^* = (T^*+1)E^*/2 \qquad (114).$$

Accordingly, when the desired speed ratios "eF*" and "eR*" are achieved, the desired speed ratio "E*" and the desired distribution ratio "T*" are achieved.

Figure 11:
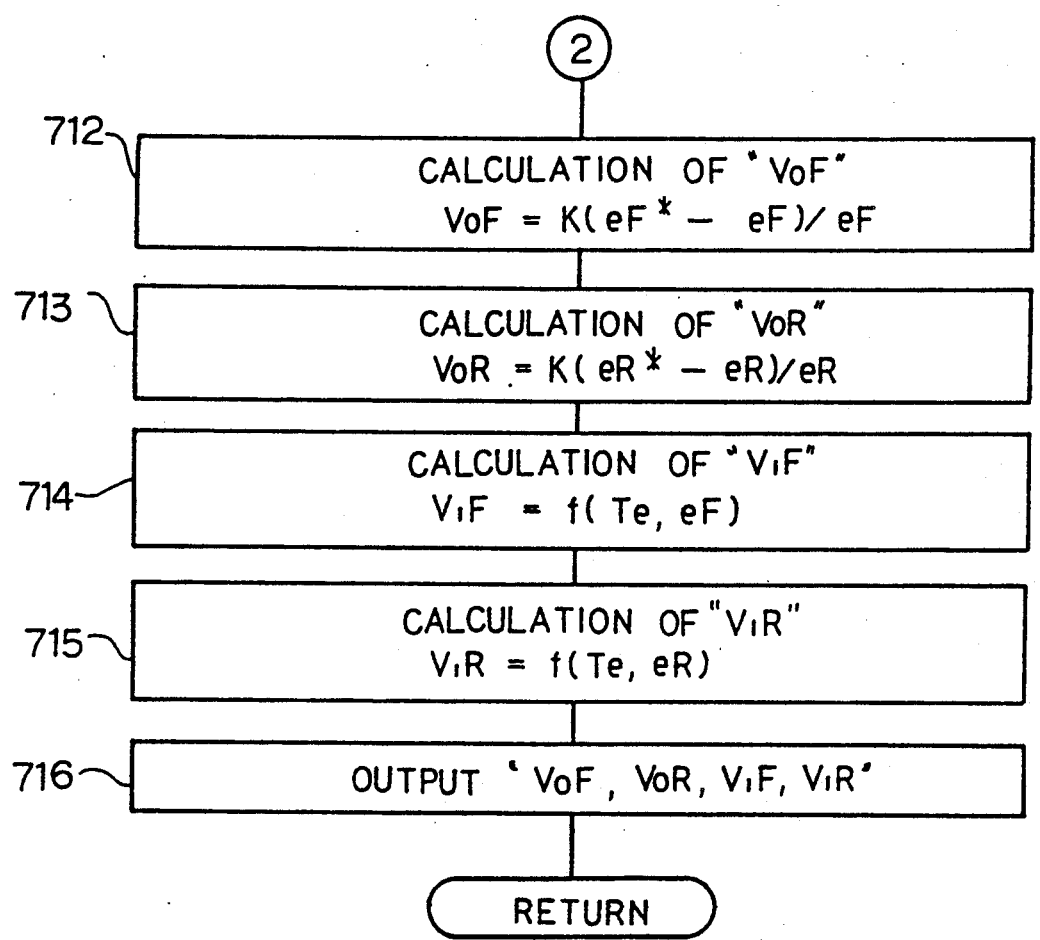
FIG. 11 is a third part of the flow chart.

After the step 710, the step 711 is processed. The step 711 is a subroutine for compensating the desired speed ratios "eF*" and "eR*", which is shown in FIG. 11.

After the step 711, a step 712 is processed. The step 712 calculates first control value "VoF" of the flow control valve 27F by a formula (115) as follows:

$$VoF = K(eF^* - eF)/eF \qquad (115),$$

wherein "eF*−eF" represents difference value between the desired speed ratio "eF*" of the first continuously variable transmission 5 and an actual speed ratio "eF". The flow control valve 27F receives a signal having the first control value "VoF", and functions to reconcile the actual value "eF" with the desired speed ratio "eF*".

In a similar manner to the step 712, a step 713 calculates a second control value "VoR" of the flow control valve 27R by a formula (116) as follows:

$$VoR = K(eR^* - eR)/eR \qquad (116).$$

After the step 713, a step 714 calculates third control value "V₁F" of the pressure control valve 26F of the first continuously variable transmission 5 in accordance with engine torque "Te" and the actual speed ratio "eF" by a formula (117), as follows:

$$V_1F = f(Te, eF) \qquad (117),$$

wherein the third control value "V₁F" is a function of the engine torque "Te" and the actual speed ratio "eF".

Accordingly, the pressure control valve 26F controls the hydraulic pressure to be supplied to the hydraulic cylinder 20 in accordance with the third control value "V₁F". As a result, the first continuously variable transmission 5 transmits the torque without any slip of the belt.

In a similar manner to the step 714, a step 715 calculates fourth control value "V₁R" of the pressure control valve 26R of the second continuously variable transmission 6 in accordance with the engine torque "Te" and the actual speed ratio "eR" by a formula (118), as follows:

$$V_1R = f(Te, eR) \qquad (118).$$

After the step 715, a step 716 outputs the first through fourth control values "VoF", "VoR", "V₁F" and "V₁R".

As shown in FIG. 11, the "eF*", "eR*" subroutine includes steps 601 through 610, and determines whether the desired speed ratio "eF*" is within an area defined between eF$_{min}$ and eF$_{max}$, or whether the desired speed ratio "eR*" is within an area defined between eR$_{min}$ and eR$_{max}$.

The step 601 determines whether the desired speed ratio "eF*" is equal to or smaller than a maximum value of the speed ratio "eF". If the step 601 determines "Yes", the step 603 is processed. On the other hand, if the step 601 determines "No", the step 602 is processed.

Because the desired speed ratio "eF*" is greater than the maximum value "eF$_{max}$", the controlling method cannot achieve the desired speed ratio "eF*". In step 602, the desired speed ratio "eF*" is compensated and the desired speed ratio "eF*" becomes the maximum value "eF$_{max}$".

The step 603 determines whether the desired speed ratio "eF*" is equal to or greater than a minimum value "eF$_{min}$" of the speed ratio. When the step 603 determines that the desired speed ratio "eF*" is smaller than the minimum value "eF$_{min}$", the step 604 compensates the desired speed ratio "eF*" so as to be equal to the minimum value "eF$_{min}$". When the desired speed ratio "eF*" is compensated in the step 602 or 604, the step 605 is processed.

The step 605 compensates the desired speed ratio "eR*" in accordance with the compensated speed ratio "eF*" by a formula (119), as follows:

$$eR^* = E \cdot eF^*/(2 \cdot eF^* - E) \qquad (119),$$

The formula (119) is derived from the formula (101), so that even when the desired speed ratio "eF*" of the first continuously variable transmission 5 is compensated, the desired speed ratio "E*" of the transmission means is achieved. After the step 605, the step 712 of the main routine is processed.

When the step 603 determines "Yes" the step 606 is processed. The step 606 determines whether the desired speed ratio "eR*" of the second continuously variable transmission 6 is equal to or less than a maximum value "eR$_{max}$" of the speed ratio.

When the step 606 determines "Yes", the step 608 is processed, and when the step 606 determines "No", the step 607 is processed. When the desired speed ratio "eR*" is greater than the maximum value "eR$_{max}$", the step 607 compensates the desired speed ratio "eR*" so as to be the maximum value "eR$_{max}$".

The step 608 determines whether the desired speed ratio "eR*" is equal to or greater than a minimum value "eR$_{min}$".

When the step 608 determines "YES", the step 712 of the main routine is processed, and when the step 608 determines "NO", the step 609 is processed. When the desired speed ratio "eR*" is less than the minimum value "eR$_{min}$", the step 609 compensates the desired speed ratio "eR*" so as to be the minimum value "eR$_{min}$".

When the desired speed ratio "eR*" is compensated by the step 607 or 609, the step 610 compensates the desired speed ratio "eF*" by a formula (120), as follows:

$$eF^* = E \cdot eR^*/(2\, eR^* - E) \qquad (120).$$

The formula (120) is derived from the formula (101), so that even when the desired speed ratio "eR*" of the second continuously variable transmission 6 is compensated, the desired speed ratio "E*" of the transmission means is achieved.

The operation of the sixth embodiment mentioned is discussed below.

For example, as shown in FIG. 8, when the desired speed ratio "E*" of the transmission means is determined to be 2 by a driving condition of the vehicle, and the desired distribution ratio "T*" of the driving torque is determined to be 0.5 by the driving condition of the vehicle, a point "A" representing the desired speed ratio "E*" and the desired distribution ratio "T*" is outside the area that the controlling method according to the present invention can control, i.e., the desired speed ratio "eF*" of the first continuously variable transmission 5 is greater than the maximum value 2.5 of the speed ratio to be controlled.

Accordingly, the eF*, eR* subroutine 711 is processed and the desired speed ratio "eF*" is compensated to be 2.5, but the desired speed ratio "E*" of the transmission means is maintained so as to be 2. As a result, the "A" point is moved up to the point "B".

As above-mentioned, in the eF*, eR* subroutine 711, the desired speed ratio "E*" is achieved before the desired distribution ratio "T*" is achieved. That is, the controlling method controls the actual speed ratio to be equal to the desired speed ratio "E*", then the controlling method controls the actual distribution ratio to be equal to the desired distribution ratio "T*", since the desired speed ratio "E*" reflects intention of an operator more than the desired distribution ratio "T*".

Figure 12:
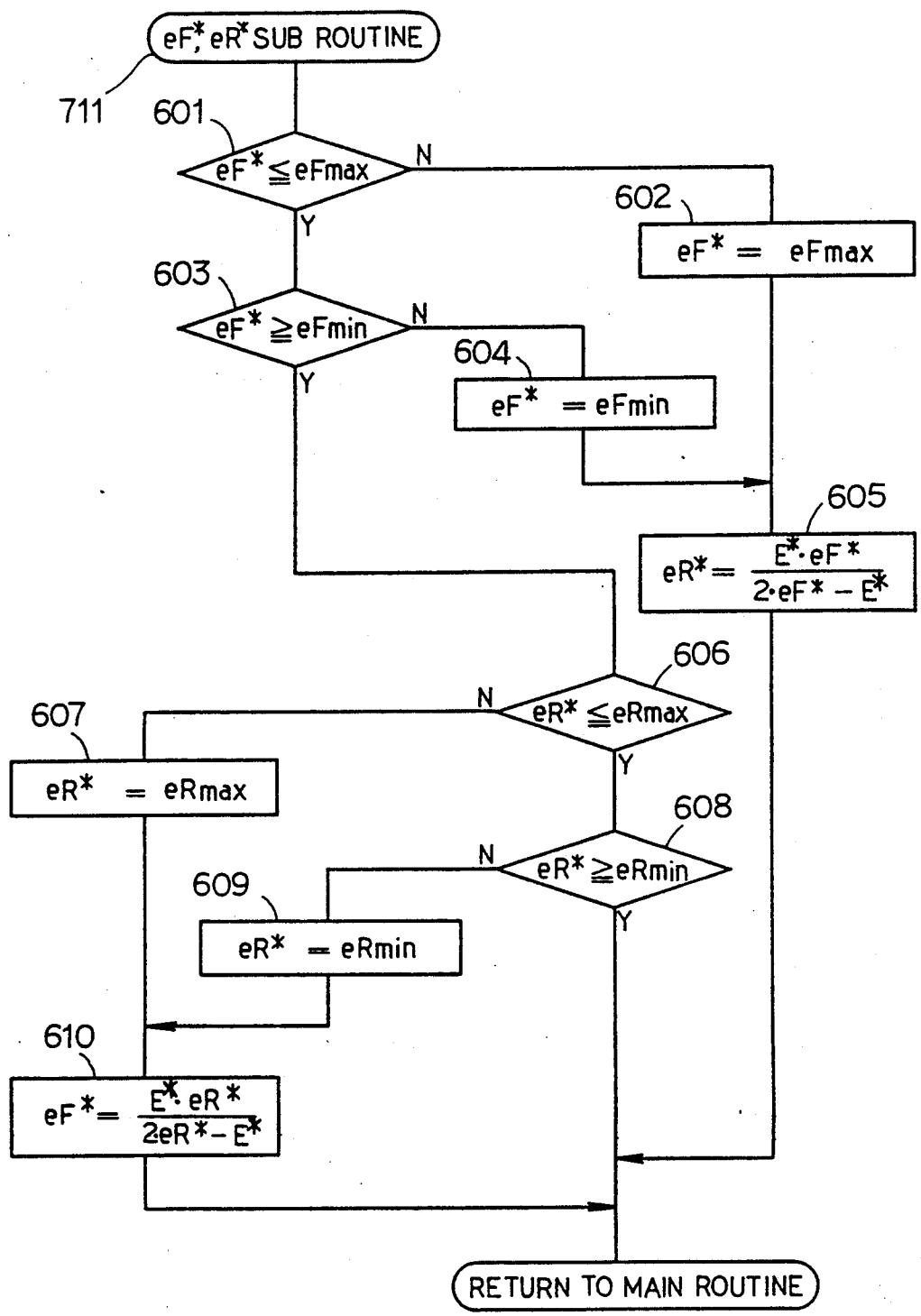
FIG. 12 is a flow chart of an eF*, eR* subroutine shown in FIG. 10.

The flow chart shown in FIG. 12 only correctly functions when the desired speed ratio "E*" is within an area between 0.4 and 2.5 and the desired distribution ratio "T*" is within an area between 0.16 and 6.25. Accordingly, the steps 705 and 706 include further sub-steps 751 through 754 and 761 through 764 limiting the values of the desired speed ratio "E*" (to the range of 0.4 to 2.5) and the desired distribution ratio "T*" (to the range of 0.16 to 6.25). For example, if "E*" is determined to be greater than 2.5 or less than 0.4, it is respectively set at 2.5 or 0.4. Similarly, if "T*" is determined to be greater than 6.25 or less than 0.16, it is respectively set at 6.25 or 0.16.

Figure 13:
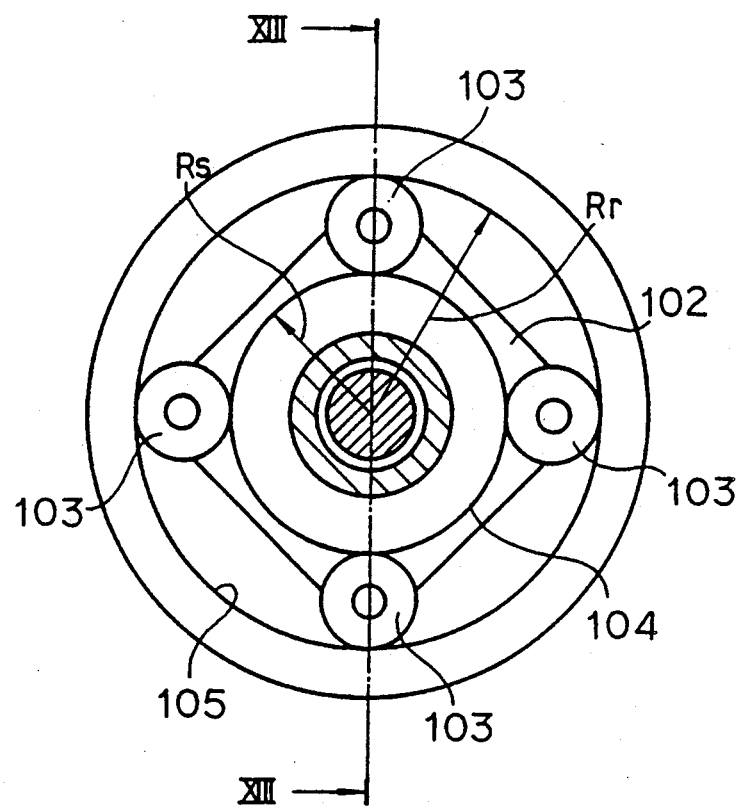
FIG. 13 is a plane view of an epicyclic reduction gear for use with a seventh embodiment of the four wheel drive system.
Figure 14:
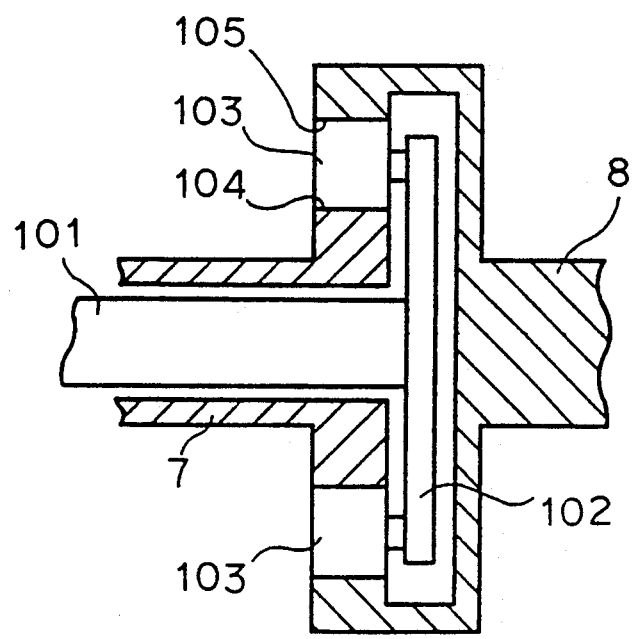
FIG. 14 is a cross-sectional view of the epicyclic reduction gear taken along the line XIII—XIII in FIG. 13.

FIGS. 13 and 14 show an epicyclic reduction gear which is used in a seventh embodiment according to the present invention instead of the differential gear mechanism 4 of the sixth embodiment shown in FIG. 6.

In the sixth embodiment, when the distribution ratio "T" of the driving torque 1, the value of the speed ratio "eF" of the first continuously variable transmission 5 is the same as that of the speed ratio "eR" of the second continuously variable transmission 6. Accordingly, the value of the actual speed ratio "E" of the transmission means may be within an area between 0.4 and 2.5.

Further, when the value of the distribution ratio "T" of the driving torque is 1, the actual speed ratio "eF" is equal to the actual speed ratio "eR". In this condition, the differential gear mechanism 4 is rotated as one unit without any difference between the first and second output torque lines, so that transmittal efficiency of the transmission is maximized.

However, when the value of the distribution ratio "T" of the driving torque is not 1, a difference between the actual speed ratio "eF" and "eR" results, reducing the transmittal efficiency. Moreover, during normal driving conditions of the vehicle, the load ratio between the front and rear wheels is not 1 to 1.

However, the epicyclic reduction gear shown in FIGS. 13 and 14 can reconcile the actual distribution ratio with a suitable distribution ratio during normal driving conditions of the vehicle. For example, if in the normal driving condition of the vehicle, the suitable distribution ratio of the driving torque is 2 to 3, a ratio between a radius "Rs" of a sun gear 104 and a radius "Rr" of a ring gear 105 is determined so as to be 2 to 3. In this condition, the engine torque is transmitted from an input shaft 101 of the transmission means into a planet carrier 102. The planet carrier 102 includes a plurality of pinion gears 103 thereon. The pinion gears 103 engage with the sun gear 104 at an inside thereof, and with the ring gear 105 at an outside thereof. The sun gear 104 is secured to the input pulley 7 of the first continuously variable transmission 5 and the ring gear 105 is secured to the input pulley 8 of the second continuously variable transmission 6. Because the radius "Rs" of the sun gear 104 and the radius "Rr" of the ring gear 105 is 2 to 3, the distribution ratio "T" of the driving torque becomes 2 to 3. Accordingly, even when the actual speed ratio "eF" of the first continuously variable transmission 5 is equal to the actual speed ratio "eR" of the second continuously variable transmission 6 in the seventh embodiment, the distribution ratio "T" of the driving torque is 2 to 3. Therefore, the seventh embodiment enables a suitable distribution ratio to be achieved in the normal driving condition of the vehicle.

Further, the distribution ratio "T" of the driving torque is calculated in the seventh embodiment by a formula (121), as follows:

$$T = \beta \cdot eR/eF \quad (121)$$

wherein "$\beta$" represents the ratio between the ratio "Rs" and "Rr", and also represents the ratio between teeth number "Zs" of the sun gear and teeth number "Zr" of the ring gear.

A total input shaft revolution speed of the transmission means "$N_{in}$" is thus calculated by a formula (122), as follows:

$$N_{in} = (\beta \cdot N_{inF} + N_{inR})/(\beta + 1) \quad (122).$$

Further, when the desired speed ratio "E*" and the desired distribution ratio "T*" of the driving torque are determined, the speed ratios "eF*" and "eR*" of the first and second continuously variable transmissions 5 and 6 are calculated by formulas (123) and (124) as follows:

$$eF = \beta/(\beta+1) \cdot (T+1)/E \cdot T \quad (123)$$

$$eR = (T+1) \cdot E/(\beta+1) \quad (124)$$

Accordingly, when the speed ratios "eF*" and "eR*" are achieved, the desired speed ratio "E*" and the desired distribution ratio "T*" of the driving torque are achieved.

Figure 15:
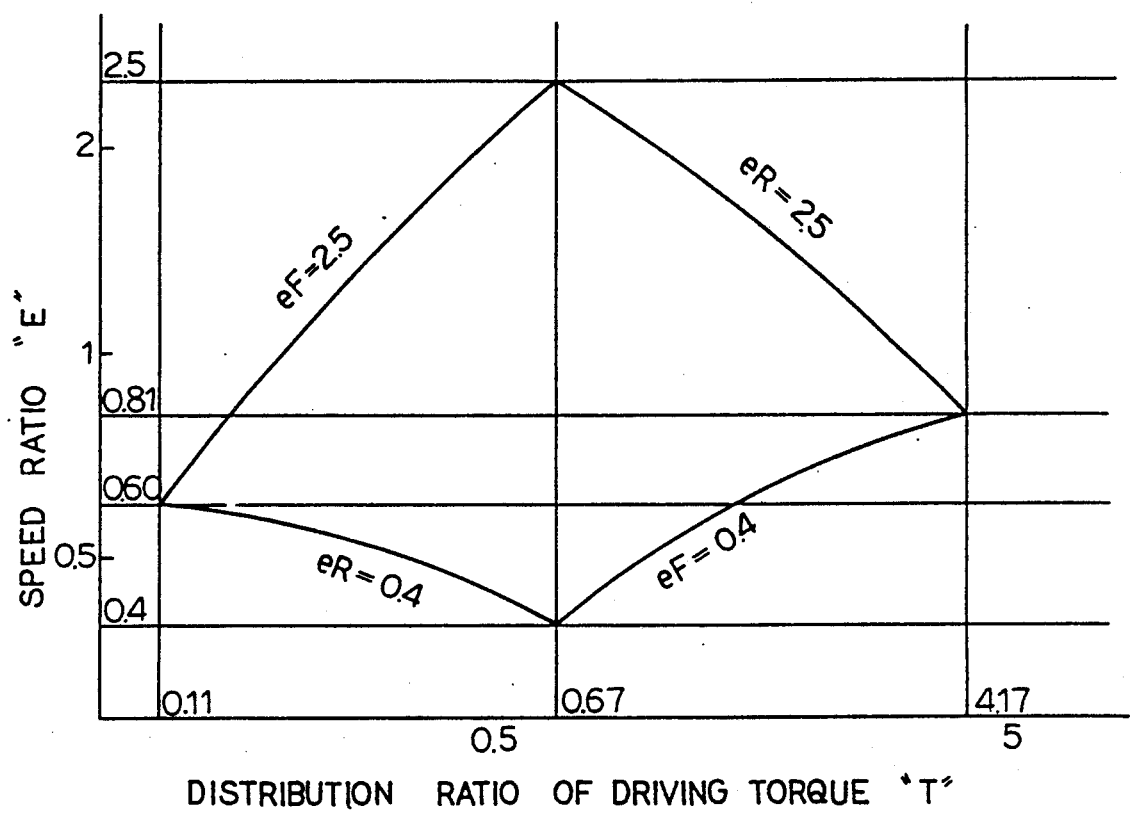
FIG. 15 is a logarithm graph showing a relationship between a speed ratio and a distribution ratio of driving torque for use in the seventh embodiment.

FIG. 15 shows a logarithm graph of a relationship between a speed ratio "E" and a distribution ratio "T" of the driving torque for use in the seventh embodiment of the controlling method. The logarithm graph shown in FIG. 15 is similar to the logarithm graph shown in FIG. 8.

FIG. 15 shows an area which satisfies formulas (125), (126) and (127) as follows:

$$0.4 \leq eF \leq 2.5 \quad (125)$$

$$0.4 \leq eR \leq 2.5 \quad (126)$$

$$\beta = \tfrac{2}{3} = 0.67 \quad (127).$$

Formulas (125) and (126) represent exemplary upper and lower limits of "eF" and "eR". Formula (127) represents an exemplary value for $\beta$.

Accordingly, when the distribution ratio "T" of the driving torque is 2 to 3, the transmission means transmits the driving torque at the highest efficiency and the transmission means consumes the minimum amount of fuel.

Further, the seventh embodiment is controlled via a similar flow chart to those shown in FIGS. 9, 10, 11 and 12.

However, the flow chart of seventh embodiment includes some differences mentioned hereinafter.

Instead of the formula (106), in the step 702, the seventh embodiment uses a formula (128) as follows:

$$N_{in}=(\beta \cdot N_{inF}+N_{inR})/(\beta+1) \quad (128)$$

Instead of the formula (113) in the step 709, the seventh embodiment uses a formula (129), as follows:

$$eF^*=\beta/(\beta+1)\cdot(T^*+1)/T^*\cdot E^* \quad (129)$$

Instead of the formula (114) in the step 710, the seventh embodiment uses a formula (130), as follows:

$$eR^*=(T^*+1)/(\beta+1)\cdot E^* \quad (130)$$

Instead of the formula (119) in the step 605, the seventh embodiment uses a formula (131), as follows:

$$eR^*=E\cdot eF^*/(\beta+1)eF^*-E \quad (131)$$

Instead of the formula (120) in the step 610, the seventh embodiment uses a formula (132) as follows:

$$eF^*=\beta\cdot E\cdot eR^*/(\beta+1)\cdot eR^*-E \quad (132)$$

Figure 16:
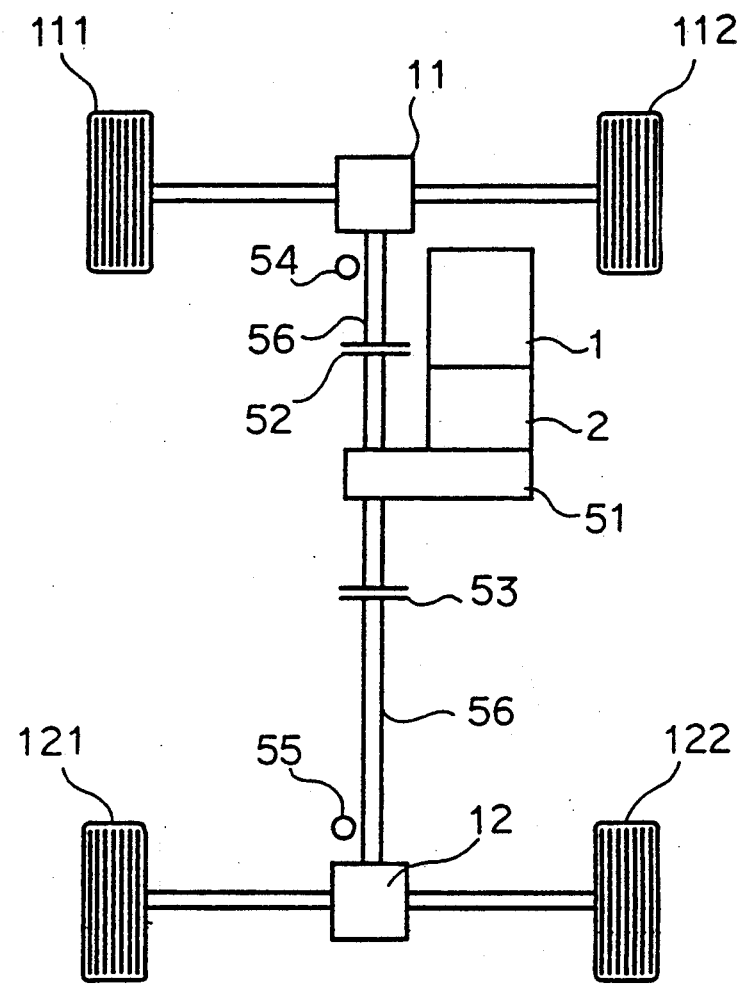
FIG. 16 is a schematic structure of an eighth embodiment of the four wheel drive system.

FIG. 16 shows an eighth embodiment of the present invention. The eighth embodiment includes an engine 1, a transmission 2, a transfer mechanism 51, wet type clutches 52 and 53 which have a plurality of engagement plates and differential gear mechanisms 11 and 12. Further, the eighth embodiment includes sensors 54 and 55 for detecting speeds of the front and rear driving propeller shafts 56. The wet type clutches 52 and 53 include hydraulic cylinder pistons (not shown in drawings), and the plurality of engagement plates are engaged by hydraulic pressure of the hydraulic cylinder pistons. Accordingly, the maximum transmittal torque of the clutches 52 and 53 (i.e., torque capacity) is determined by the hydraulic pressure. In the eighth embodiment, the distribution ratio of the driving torque is varied in accordance with variation of the hydraulic pressure to be supplied. It is desirable to control the maximum transmittal torque of one of the front and rear wheels having the transmitted smaller value of torque so that losses at the engagement plates are reduced.

Figure 17:
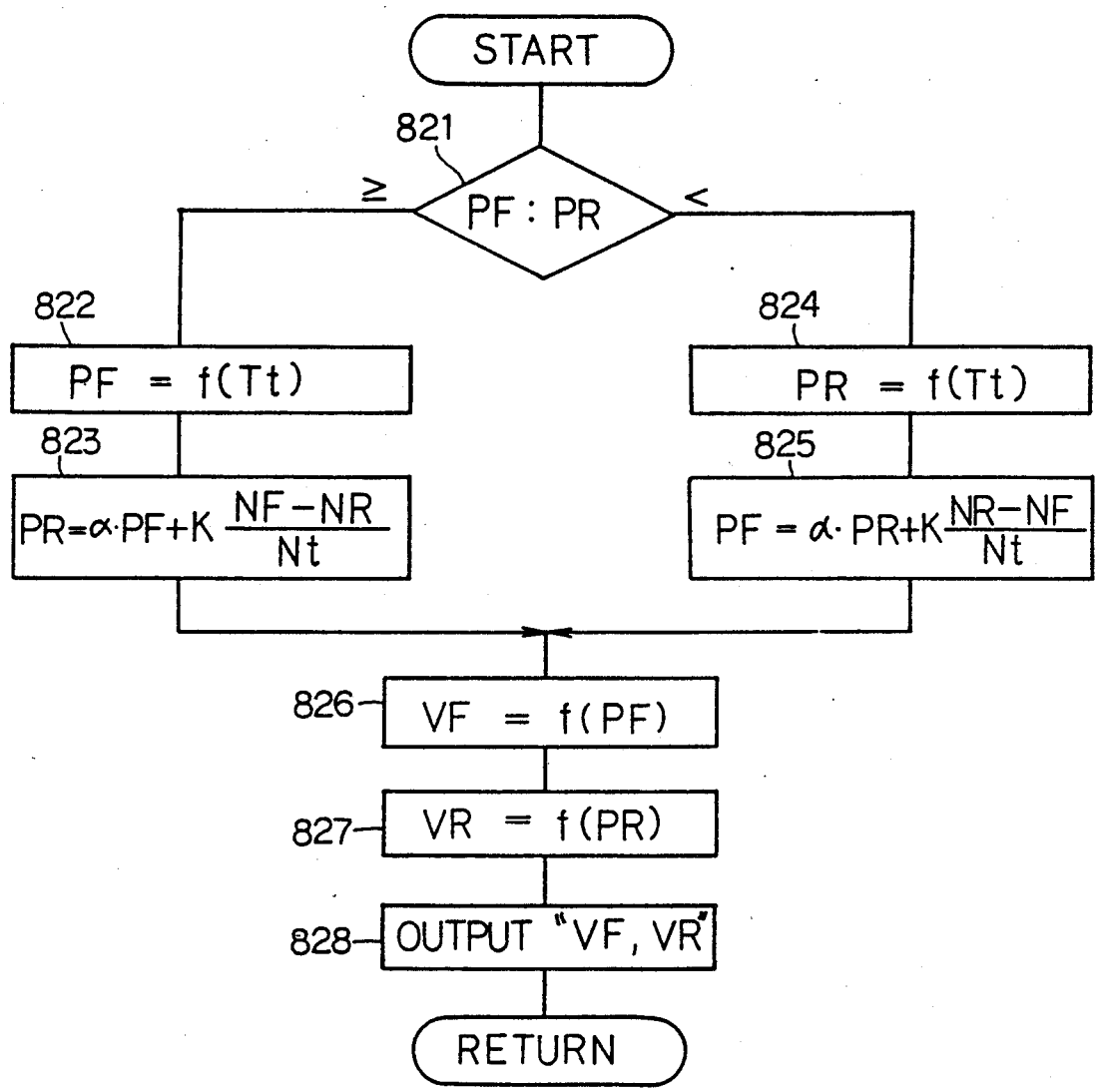
FIG. 17 is a flow chart for controlling two clutches of the eighth embodiment.

FIG. 17 shows a flow chart for controlling the eighth embodiment shown in FIG. 16.

A step 821 determines whether hydraulic pressure "PF" of the clutch 52 is greater than hydraulic pressure "PR" of the clutch 53. The clutch 52 is the same as the clutch 53, so that when the hydraulic pressure "PF" is the same as the hydraulic pressure "PR", the torque capacity of the clutch 52 is the same as the torque capacity of the clutch 53.

When the step 821 determines that the hydraulic pressure "PF" is equal to or greater than the hydraulic pressure "PR", a step 822 is processed. The step 822 calculates the desired hydraulic pressure "PF", in accordance with the output shaft torque "Tt" of the transmission 2 in order to prevent the clutch 52 from disengaging by a formula (24), as follows:

$$PF=f(Tt) \quad (24)$$

After the step 822, a step 823 calculates the hydraulic pressure of the rear clutch 53 by a formula (25) as follows:

$$PR=a\cdot PF+K(NF-NR)/Nt \quad (25),$$

wherein "a" represents a constant value which is less than one, "NF" represents the speed of the front propeller shaft 56, "NR" represents the speed of the rear propeller shaft 56, "Nt" represents the speed of the output shaft of the transmission 2, and "K" represents the proportional gain and is experimentally determined. The basic item "a·PF" determines basic hydraulic pressure which is less than the hydraulic pressure "PF", and a feedback item "K(NF−NR)/Nt" adds feedback pressure to the basic hydraulic pressure. As a result, the hydraulic pressure "PR" is determined. Accordingly, the condition when the front wheels 111 and 112 slip, the speed "NF" is greater than the speed "NR" (i.e., NF>NR). As a result, the feedback item "K(NF−FR)/Nt" of the formula (25) has a positive value, and the hydraulic pressure "PR" is increased in accordance with the difference of the speed (i.e., the torque capacity is increased).

Thus, the distribution ratio of the driving torque is changed a a portion of driving torque delivered to the rear wheels is increased and the portion of driving torque delivered to the front wheels is decreased. Accordingly, the slip of the front wheels is reduced.

Contrarily, when the rear wheels 121 and 122 slip more than the front wheels 111 and 112, the speed "NF" of the front propeller shaft 56 is less than the speed "NR" of the rear propeller shaft 56. Accordingly, the feedback item "K(NF−NR)/Nt" of the formula (25) has a negative value, so that the hydraulic pressure "PR" is decreased in accordance with the difference of the speed (i.e., the torque capacity of the rear clutch 53 is decreased).

Thus, the distribution ratio of the driving torque is changed as a portion of driving torque delivered to the rear wheels is decreased, and the portion of driving torque delivered to the front wheels is increased. Accordingly, the slip of the rear wheels is reduced.

On the other hand, when the step 821 determines that the hydraulic pressure "PF" is less than the hydraulic pressure "PR", a step 824 is processed. The step 824 calculates the desired hydraulic pressure "PR", in accordance with the output shaft torque "Tt" of the transmission 2 in order to prevent the clutch 53 from disengaging by a formula (26), as follows:

$$PR=f(Tt) \quad (26).$$

After the step 824, a step 825 calculates the hydraulic pressure of the rear clutch 52 by a formula (27) as follows:

$$PR=a\cdot PR+K(NR-NF)/Nt \quad (27).$$

The steps 824 and 825 are processed in a similar manner to the steps 822 and 823. When the front wheels 111 and 112 slip more than the rear wheels 121 and 122, the distribution ratio of the driving torque of the front wheels 111 and 112 is decreased and is compensated to reduce the difference of speed between the front and rear wheels.

After step 823 or 825, a step 826 is processed.

In order to harmonize the hydraulic pressure "PF" with a pressure value controlled by a pressure control valve (not shown in drawings) which controls the hydraulic pressure to be supplied to the clutch 52, the step 826 calculates a control value "VF" in accordance with a formula (28), as follows:

$$VF = f(PF) \qquad (28).$$

After the step 826, in order to harmonize the hydraulic pressure "PR" with a pressure value controlled by a pressure control valve (not shown in drawings) which controls the hydraulic pressure to be supplied to the clutch 53, a step 827 calculates a control value "VR" in accordance with a formula (29) as follows:

$$VR = f(PR) \qquad (29).$$

After the step 827, a step 828 outputs the control values "VF" and "VR".

After the step 828, the step 821 is processed again.

Accordingly, in the eighth embodiment, the distribution ratio of the driving torque is not compensated directly, but the distribution ratio of the driving torque is adjusted at an adequate value by controlling the transmittal torque so as to reduce the difference of the speed between the front and rear wheels in accordance with the hydraulic pressure of the clutches 52 and 53.

As will be apparent to those skilled in the art, only one clutch could be used in the eighth embodiment, whereby only one of the distribution ratio of the driving torque on the front and rear wheels is always greater than the other. In this condition, the steps 821, 822, 823, 824 and 827 or the steps 821, 822, 824, 825 and 826 can be deleted from the flow chart shown in FIG. 16.

As described herein, the present invention overcomes the shortcomings of the known art by providing a method for accurately controlling a distribution ratio of driving torque between front and rear wheels.

While the present invention has been described in its preferred embodiments, it is to be understood that the invention is not limited thereto, and may be otherwise embodied within the scope of the following claims.

What is claimed is:

1. A method for controlling the drive train of a four wheel drive vehicle having an engine and front drive wheels and rear drive wheels, the four wheel drive vehicle including an apparatus for changing a distribution ratio of driving torque between the front wheels and the rear wheels, the apparatus including a transfer mechanism, and a first and a second clutch, the transfer mechanism receiving an output torque from said engine, and distributing the received output torque into two output torque lines connected to said front drive wheels and said rear drive wheels, respectively, the first clutch being located in one of said two output torque lines and transmitting a first amount of the output torque to a front driving shaft connected to said front drive wheels, while the second clutch being located in the other of said two output torque lines and transmitting a second amount of the output torque to a rear driving shaft connected to said rear drive wheels, said method comprising the steps of:

detecting speeds of the front driving shaft and the rear driving shaft;

calculating an actual difference in speed between the detected speeds of said front and rear driving shafts; and determining said first and second amounts of the output torque transmitted by said first and second clutches to said front and rear driving shafts, respectively, to change an actual distribution ratio of driving torques between said front and rear drive wheels, so that the calculated difference in speed between said front and rear driving shafts is reduced to a desired value.

2. The method of claim 1, wherein the desired value is zero.

3. A method according to claim 1, wherein said step of determining said first and second amounts of the output torque of said first and second clutches comprises increasing one of said first and second amounts which is transmitted to one of said front and rear driving shafts whose speed is lower that the other of said front and rear driving shafts, while decreasing the other of said first and second amounts.

4. A method according to claim 3, wherein said first and second clutches are hydraulically operated clutches which are operated by first and second hydraulic pressures applied thereto respectively, and wherein said step of determining said first and second amounts of the output torque comprises increasing one of said first and second hydraulic pressures which is applied to one of said first and second clutches which is located in one of said two output torque lines which is connected to said one driving shafts, while decreasing the other of said first and second hydraulic pressures which is applied to the other of said first and second clutches.

5. A method according to claim 4, wherein said step of determining said first and second amount of the output torque further comprises:

comparing current values of said first and second hydraulic pressure with each other; determining a control value for a higher one of the compared values of said first and second hydraulic pressures depending upon an output torque of said transfer mechanism; and determining a control value for the other of said first and second hydraulic pressures depending upon the determined one of said first and second hydraulic pressures and said difference in speed between said front and rear driving shafts so that said difference is reduced to said desired value.

* * * * *